United States Patent
Lee et al.

(10) Patent No.: US 12,103,036 B2
(45) Date of Patent: Oct. 1, 2024

(54) MULTI-SLOT DIE COATER

(71) Applicant: LG Energy Solution, Ltd., Seoul (KR)

(72) Inventors: Taek-Soo Lee, Daejeon (KR);
Shin-Wook Jeon, Daejeon (KR);
Sang-Hoon Choy, Daejeon (KR);
Jin-Ho Cho, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 0 days.

(21) Appl. No.: 17/922,723

(22) PCT Filed: Aug. 20, 2021

(86) PCT No.: PCT/KR2021/011144
§ 371 (c)(1),
(2) Date: Nov. 1, 2022

(87) PCT Pub. No.: WO2022/045684
PCT Pub. Date: Mar. 3, 2022

(65) Prior Publication Data
US 2023/0166287 A1 Jun. 1, 2023

(30) Foreign Application Priority Data

Aug. 26, 2020 (KR) .......................... 10-2020-0108076
Aug. 26, 2020 (KR) .......................... 10-2020-0108112

(51) Int. Cl.
*B05C 5/02* (2006.01)
(52) U.S. Cl.
CPC .................................. *B05C 5/0262* (2013.01)
(58) Field of Classification Search
CPC ..... B05C 5/027; B05C 5/0254; B05C 5/0262; B05C 9/00; B05C 9/06; B05C 11/10;
(Continued)

(56) References Cited

U.S. PATENT DOCUMENTS

2003/0157252 A1  8/2003  Tokimasa et al.
2004/0237886 A1*  12/2004  Meissner .............. B05C 5/0279
                                                         118/506
(Continued)

FOREIGN PATENT DOCUMENTS

CN      205762070 U      12/2016
CN      109261438 B       8/2020
(Continued)

OTHER PUBLICATIONS

International Search Report for Application No. PCT/KR2021/011144 mailed Nov. 10, 2021, pp. 1-3.
(Continued)

*Primary Examiner* — Yewebdar T Tadesse
(74) *Attorney, Agent, or Firm* — Lerner David LLP

(57) ABSTRACT

There is provided a multi-slot die coater that is easy to adjust a coating gap and can achieve widthwise deviation control of the coating gap. According to the present disclosure, a step is formed between rear surfaces of die blocks through a fixing block including a step adjustment block. The step adjustment block has a preset thickness, and the step adjustment block is mounted between any one die block and a flat plate-shaped block, and the other die block is coupled to the flat plate-shaped block, and thus the step is naturally formed between the rear surfaces of the die blocks by the coupling of the die blocks to the fixing block including the step adjustment block.

20 Claims, 27 Drawing Sheets

(58) Field of Classification Search
CPC ... B05C 11/1044; H01M 4/0404; H01M 4/04;
B05D 1/26; B05D 1/265; B05D 3/12;
B29C 48/21; B29C 45/14; B29C 43/18;
B29C 48/16; B29C 64/205; B29C
37/0025; Y02E 60/10
USPC .................................................. 118/411, 412
See application file for complete search history.

(56) References Cited

U.S. PATENT DOCUMENTS

| | | |
|---|---|---|
| 2004/0247723 A1 | 12/2004 | Wyatt |
| 2006/0096528 A1 | 5/2006 | Kawatake et al. |
| 2008/0274223 A1 | 11/2008 | Cloeren |
| 2018/0250701 A1 | 9/2018 | Kuenne |

FOREIGN PATENT DOCUMENTS

| | | |
|---|---|---|
| EP | 3782737 A1 | 2/2021 |
| JP | 3899485 B2 | 3/2007 |
| JP | 5388474 B2 | 1/2014 |
| JP | 2018144030 A | 9/2018 |
| KR | 100858889 B1 | 9/2008 |
| KR | 101086298 B1 | 11/2011 |
| KR | 20200037662 A | 4/2020 |
| KR | 20200082084 A | 7/2020 |

OTHER PUBLICATIONS

Extended European Search Report including Written Opinion for Application No. 21861981.5 dated Oct. 13, 2023, pp. 1-9.

* cited by examiner

MULTI-SLOT DIE COATER

CROSS-REFERENCE TO RELATED APPLICATIONS

The present application is a national phase entry under 35 U.S.C. § 371 of International Application No. PCT/KR2021/011144, filed on Aug. 20, 2021, which claims priority from Korean Patent Application Nos. 10-2020-0108076 and 10-2020-0108112 filed on Aug. 26, 2020, in the Republic of Korea, the disclosures of which are incorporated herein by reference.

TECHNICAL FIELD

The present disclosure relates to a multi-slot die coater capable of simultaneously forming two or more layers by wetting, and more particularly, to a multi-slot die coater having a widthwise deviation control means of a coating gap.

BACKGROUND ART

With the increasing technology development and the growing demand for mobile devices, the demand for secondary batteries as an energy source is rapidly increasing, and such secondary batteries essentially include an electrode assembly which is a power generation element. The electrode assembly includes a positive electrode, a separator, and a negative electrode stacked at least once, and the positive electrode and the negative electrode are prepared by coating and drying a positive electrode active material slurry and a negative electrode active material slurry on a current collector made of an aluminum foil and a current collector made of a copper foil, respectively. For the uniform charging/discharging characteristics of the secondary batteries, it is necessary to uniformly coat the positive electrode active material slurry and the negative electrode active material slurry on the current collector, and slot die coaters have been used.

FIG. 1 shows an example of a coating method using the conventional slot die coater.

Referring to FIG. 1, an electrode manufacturing method using the slot die coater includes applying an active material slurry issuing from a slot die coater 30 to a current collector 20 transferred by a coating roll 10. The active material slurry issuing from the slot die coater 30 is applied across one surface of the current collector 20 to form an electrode active material layer. The slot die coater 30 includes two die blocks 31 and 32 and a slot 35 between the two die blocks 31 and 32, and may dispense one type of active material slurry through an exit port 37 in communication with the slot 35 to form a layer of active material. Compared to bar coating or comma coating, the slot die coater achieves high-speed coating, and due to this advantage, it is widely applied from the perspective of high productivity.

To manufacture secondary batteries with high energy density, the thickness of the active material layer which was about 130 µm has gradually increased up to 300 µm. When the thick active material layer is formed with the conventional slot die coater 30, the final electrode is manufactured non-uniformly due to severe migration of a binder and a conductive material in the active material slurry during drying. To solve this problem, when applying the active material layer at a small thickness and drying and repeating this process thereon, it takes a long time to perform coating twice. To improve both electrode performance and productivity, a dual slot die coater capable of simultaneously applying two types of active material slurries is required.

FIG. 2 is a cross-sectional view of the conventional dual slot die coater along the movement direction (machine direction (MD)) of the current collector 20.

Referring to FIG. 2, the dual slot die coater 40 is configured by assembling three die blocks 41, 42, and 43. Slots are formed between the adjacent die blocks 41, 42 and 43, and accordingly the dual slot die coater 40 includes two slots 45 and 46. Two types of active material slurries are simultaneously applied on the current collector 20 through exit ports 47 and 48 in communication with the slots 45 and 46, respectively. Two active material layers may be simultaneously formed by continuously applying an additional active material slurry on an active material layer formed by a previously applied active material slurry.

Due to using the active material slurries simultaneously issuing from the different exit ports 47 and 48, the process using the dual slot die coater 40 is quite difficult to form each active material layer to a desired thickness.

The distance G from the exit ports 47, 48 to the current collector 20 surface is a coating gap, and is a very important variable in determining the coating quality of the active material layer. In general, the thickness of each active material layer is affected by the amount of the active material slurry coming out of the exit ports 47, 48, the type of the active material slurry and the coating gap. Additionally, when the coating gap is uniform in the widthwise direction (TD direction) of the current collector, stable coating is achieved, and a widthwise coating gap deviation greatly affects the coating width and the non-coated boundary shape. The thickness of the active material layer is very small value of a few tens to a few hundreds of µm, and even a few µm change greatly affects the coating quality, so it is necessary to manage the thickness of the active material layer very strictly, and to stably perform uniform coating in the widthwise direction of the current collector, it is necessary to manage very strictly to achieve uniform dimensional precision in widthwise direction. However, when the dual slot die coater 40 increases in width to use a wide current collector in order to increase the production amount, it is more difficult to achieve uniform coating in the widthwise direction, and accordingly precise control of the coating gap is more necessary.

In addition, an appropriate range of the coating gap is set according to the type of the active material slurry. In the production process, different types of active material slurries, not a single type of active material slurry, are used to produce various types of products. It is difficult to provide each dual slot die coater dedicated for each active material slurry to use different types of active material slurries. Accordingly, a type of active material slurry is coated using a dual slot die coater, and after the coating is completed, a different type of active material slurry is coated using the same dual slot die coater, and at that time, it is necessary to change the previously set coating gap. In addition, since it is difficult to always uniformly prepare even the same type of active material slurry, there is dispersion in properties depending on when the slurry is prepared, so it is necessary to respond to the dispersion, and as the coating is performed faster, there is a larger coating quality deviation caused by the dispersion of the properties of the active material slurry, and accordingly it is more important to control the coating gap.

To form a desired coating gap, the conventional art repeats the task of testing the coating process a few times, which requires disassembly and re-assembly of each die block and coating gap adjustment and checking. However, the coating gap is a variable that is adjusted so sensitively that the coating gap changes depending on the fastening strength of bolts used to assemble the die blocks 41, 42, and 43, and may be changed by a force used to pump the active material slurry. Since the slot die coater has the slot on the coupling surface of the die blocks, basically three die blocks 41, 42, and 43 are needed to include the two slots 45 and 46 like the dual slot die coater 40. To configure a device having a foot print and volume similar to the conventional slot die coater 30 including one slot, it is necessary to reduce the thickness of each of the die blocks 41, 42, and 43, and by this reason, inevitably, it is structurally vulnerable to deformation and torsion. When deformation or torsion occurs, the adjusted coating gap is changed, causing an error in the electrode process. Furthermore, this problem will be more serious with the multi-slot die coater having the increased number of die blocks due to including two or more slots.

DISCLOSURE

Technical Problem

The present disclosure is designed to solve the above-described problem, and therefore the present disclosure is directed to providing a multi-slot die coater that is easy to adjust a coating gap and can control a widthwise deviation of the coating gap.

However, the problems to be solved by the present disclosure are not limited to the above problems, and other problems that are not mentioned will be clearly understood by those skilled in the art from the description of the invention described below.

Technical Solution

To solve the above-described problem, a multi-slot die coater according to a configuration of the present disclosure is a multi-slot die coater comprising a lower slot and an upper slot, and the multi-slot die coater comprises a lower die block; an intermediate die block positioned on the lower die block such that the lower slot is formed between the intermediate die block and the lower die block; and an upper die block positioned on the intermediate die block such that the upper slot is formed between the upper die block and the intermediate die block, wherein the lower die block, the intermediate die block and the upper die block include a lower die lip, an intermediate die lip and an upper die lip that form front ends thereof, respectively, the multi-slot die coater further comprises a fixing block on rear surfaces of the die blocks at a side opposite the front end, the fixing block bolted to the rear surfaces of at least two of the die blocks to couple the two die blocks, and the fixing block includes a flat plate-shaped block having a reference plane in close contact with the rear surface of any one of the two die blocks, and a step adjustment block which is mounted/demounted between the rear surface of the other die block among the two die blocks and the flat plate-shaped block, the step adjustment block having a sufficient thickness to form a step between the rear surfaces of the die blocks coupled to the fixing block when mounted.

According to an aspect of the present disclosure, the flat plate shaped-block couples the upper die block and the intermediate die block, and the step adjustment block comes into close contact with the rear surface of the upper die block or the rear surface of the intermediate die block.

In this instance, the flat plate-shaped block may be extended to the rear surface of the lower die block, and thus the flat plate-shaped block may be also coupled to the rear surface of the lower die block. In another example, the multi-slot die coater may further comprise a flat plate-shaped fixing portion which is bolted to the rear surface of the intermediate die block and the rear surface of the lower die block.

According to another aspect of the present disclosure, the flat plate-shaped block couples the intermediate die block and the lower die block, and the step adjustment block comes into close contact with the rear surface of the intermediate die block or the rear surface of the lower die block.

In this instance, the flat plate-shaped block may be extended to the rear surface of the upper die block, and thus the flat plate-shaped block may be also coupled to the rear surface of the upper die block. In another example, the multi-slot die coater may further comprise a flat plate-shaped fixing portion which is bolted to the rear surface of the upper die block and the rear surface of the intermediate die block.

In a specific example, the flat plate-shaped block couples the upper die block and the intermediate die block, the step portion comes into close contact with the rear surface of the upper die block, and the upper die block may be shorter in length than the intermediate die block and the lower die block.

The lower die lip, the intermediate die lip and the upper die lip may be disposed on a same straight line.

In another example, a lower exit port in communication with the lower slot is formed between the lower die lip and the intermediate die lip, an upper exit port in communication with the upper slot is formed between the intermediate die lip and the upper die lip, the multi-slot die coater extrudes and coats an active material slurry on a surface of a continuously moving substrate through at least one of the lower slot or the upper slot, and a step is formed between the lower exit port and the upper exit port.

A multi-slot die coater according to another configuration of the present disclosure is a multi-slot die coater comprising a lower die including a lower slot, and an upper die positioned on or adjacent to the lower die, the upper die including an upper slot, wherein a first flat surface formed on the lower die and a second flat surface formed below the upper die contact each other to form a sliding surface, and the upper die and the lower die are installed such that any one of the upper die and the lower die slides along the sliding surface to make relative movement in a horizontal direction, the multi-slot die coater further comprises a fixing block on rear surfaces of the lower die and the upper die on a side opposite a front end of the lower die and the upper die, the fixing block bolted to the rear surfaces to couple the lower die and the upper die, and the fixing block includes a flat plate-shaped block having a reference plane in close contact with the rear surface of any one of the two die blocks, and a step adjustment block which is mounted/demounted between the rear surface of the other die block among the two die block and the flat plate-shaped block, the step adjustment block having a sufficient thickness to form a step between the rear surfaces of the two die blocks coupled to the fixing block when mounted.

The lower die may include a lower die block and a first intermediate die block positioned on or adjacent to the lower die block such that the lower slot is formed between the first intermediate die block and the lower die block, and the upper die may include a second intermediate die block installed on the first intermediate die block and an upper die block positioned on or adjacent to the second intermediate die block such that the upper slot is formed between the upper die block and the second intermediate die block.

The flat plate-shaped block may couple the first intermediate die block and the second intermediate die block, and the step adjustment block may come into close contact with the rear surface of the second intermediate die block or the rear surface of the first intermediate die block.

The multi-slot die coater may further comprise a flat plate-shaped fixing portion which is bolted to the rear surface of the upper die block and the rear surface of the second intermediate die block or a flat plate-shaped fixing portion which is bolted to the rear surface of the first intermediate die block and the rear surface of the lower die block.

Here, the step adjustment block may come into close contact with the rear surface of the second intermediate die block, and the upper die may be shorter in length than the lower die.

Additionally, the lower die block, the first intermediate die block, the second intermediate die block and the upper die block may include a lower die lip, a first intermediate die lip, a second intermediate die lip and an upper die lip that form the front ends thereof, respectively, and the lower die lip, the first intermediate die lip, the second intermediate die lip and the upper die lip may be disposed on a same straight line.

The lower die lip, the first intermediate die lip, the second intermediate die lip and the upper die lip may include a lower die lip, a first intermediate die lip, a second intermediate die lip and an upper die lip that form front ends thereof, respectively, a lower exit port in communication with the lower slot may be formed between the lower die lip and the first intermediate die lip, an upper exit port in communication with the upper slot may be formed between the second intermediate die lip and the upper die lip, the multi-slot die coater may extrude and coat an active material slurry on a surface of a continuously moving substrate through at least one of the lower slot or the upper slot, and a step may be formed between the lower exit port and the upper exit port.

In the multi-slot die coaters according to the present disclosure, a plurality of fixing blocks may be provided in a widthwise direction of the multi-slot die coater.

A cross section running across the step adjustment block and the reference plane in the fixing block may include a first cross section portion and a second cross section portion extending perpendicular to the first cross section portion.

The step adjustment block may be a plate-shaped member having a groove recessed from a lower surface in a direction perpendicular to the thickness-wise direction to fit over the bolt fastened to the flat plate-shaped block. A handle used when mounting/demounting may be provided on an upper surface of the plate-shaped member.

A plurality of bolts fastened to the flat plate-shaped block may be provided along a horizontal or vertical direction of the flat plate-shaped block, and the step adjustment block may be fit over at least one of the bolts. For example, the step adjustment block may have a size corresponding to each one bolt.

Advantageous Effects

According to the present disclosure, the step is formed between the rear surfaces of the die blocks through the fixing block including the step adjustment block. The step adjustment block has the preset thickness and the step adjustment block is mounted between any one die block and the flat plate-shaped block and the other die block is coupled to the flat plate-shaped block, and thus the step is naturally formed between the rear surfaces of the die blocks by the coupling of the die blocks to the fixing block including the step adjustment block. Thus, it is possible to always maintain the distance between the front ends of the die blocks and the substrate, i.e., the coating gap at a desired level, and since the fixing block is fixed between the die blocks, once it is set, the coating gap does not change and is maintained during the process, thereby suppressing the widthwise coating gap deviation.

Accordingly, according to the present disclosure, there is no need to disassemble and re-assemble the die blocks which are structurally vulnerable due to their small thickness when adjusting the coating gap, and it is possible to always maintain the uniform coating gap by simple manipulation of coupling the die blocks to the fixing block and straightforward mounting/demounting of the step adjustment block. In addition, the fixing block can reliably achieve uniform widthwise gap control through the large surface contact of the means such as the block.

According to the present disclosure, it is possible to uniformly control the coating amount and the resultant coating quality by maintaining the uniform ($\pm 2\%$) coating gap even though considering that the die block is deformed by the pressure of the active material slurry coming out. Accordingly, it is possible to obtain coated products, in particular, electrodes for secondary batteries, with uniform quality by using the multi-slot die coater having the uniform coating gap.

As described above, according to the present disclosure, even if the pressure of the active material slurry coming out increases, it is possible to maintain the coating gap once it is adjusted, despite the use of the thin die blocks. It is possible to ensure coating workability and reproducibility.

Using the multi-slot die coater, it is possible to uniformly form a coating layer, in particular, an active material layer, to a desired thickness, and preferably, it is possible to simultaneously coat two types of active material slurries, thereby improving the performance and productivity.

According to the present disclosure, a plurality of fixing blocks may be provided in the widthwise direction of the multi-slot die coater. Thus, it is possible to achieve precise control without widthwise coating gap deviation. Accordingly, it is possible to manage with uniform dimensional precision to stably perform uniform coating in the widthwise direction on the wide current collector.

An appropriate range of the coating gap may be set according to the type of the active material slurry. The present disclosure provides different types of step adjustment blocks having the suitable thickness and performs the process by replacing the step adjustment block necessary for each production process, and thus it is possible to use the multi-slot die coater for general purpose without including each multi-slot die coater dedicated to each active material slurry to use different types of active material slurries. Furthermore, it is possible to achieve a desired coating gap through mounting/demounting of the step adjustment block without needing to dissemble even the flat plate-shaped block. Additionally, when there is dispersion in the active material slurry, it is possible to quickly respond to the dispersion by immediately replacing only the step adjustment block to adjust the coating gap.

As described above, when the multi-slot die coater of the present disclosure is used to manufacture an electrode of a secondary battery by coating an active material slurry on a current collector while moving the current collector, it is possible to achieve uniform coating under high-speed or wide-scale coating conditions.

DESCRIPTION OF DRAWINGS

The accompanying drawings illustrate a preferred embodiment of the present disclosure and together with the detailed description of the present disclosure, serve to provide further understanding of the technical features of the present disclosure, and thus, the present disclosure is not construed as being limited to the drawing.

BEST MODE

Figure 1:
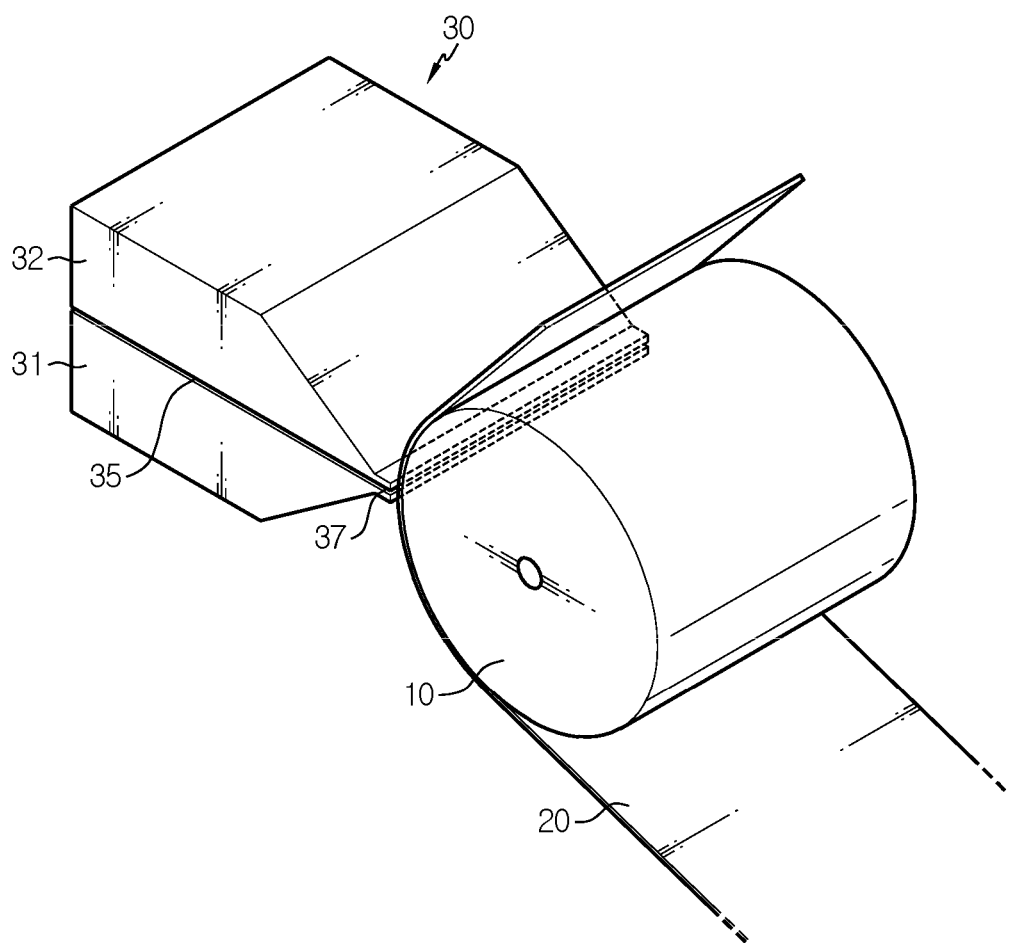
FIG. 1 is a schematic diagram showing an example of using a slot die coater according to the related art.
Figure 2:
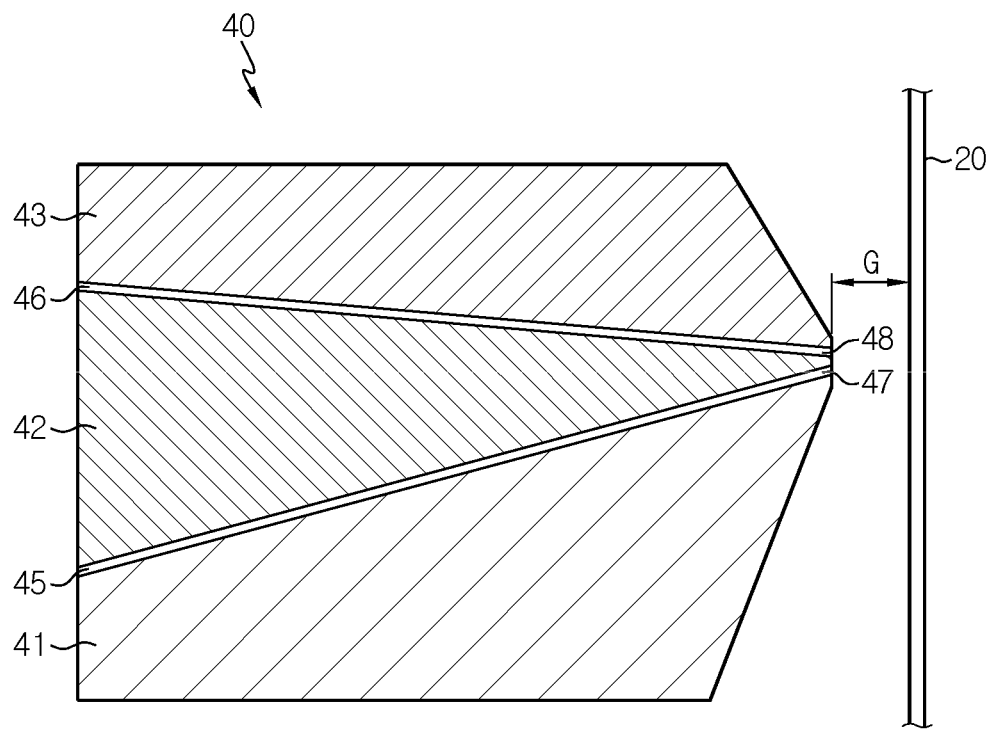
FIG. 2 is a schematic cross-sectional view of a dual slot die coater according to the related art.

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the embodiments described herein and illustrations in the drawings are just some preferred embodiments of the present disclosure and do not fully describe the technical features of the present disclosure, so it should be understood that a variety of other equivalents and modifications could have been made thereto at the time of filing the patent application.

A multi-slot die coater of the present disclosure may include two or more slots. Basically, the multi-slot die coater is an apparatus including a lower slot and an upper slot to coat a coating solution in a double layer on a substrate. The 'substrate' described below is a current collector and the coating solution is an 'active material slurry'. Both a first coating solution and a second coating solution are active material slurries, and they may have the same or different compositions (types of an active material, a conductive material and a binder), amounts (amounts of the active material, the conductive material and the binder) or properties. The multi-slot die coater of the present disclosure is optimized for electrodes manufactured by coating by applying at least two types of active material slurries simultaneously or by pattern coating by applying at least two types of active material slurries in an alternating manner. However, the scope of the present disclosure is not necessarily limited thereto. For example, the substrate may be a porous support that constitutes a separator, and the first coating solution and the second coating solution may be organics having different compositions or properties. That is, in case that thin film coating is required, the substrate, the first coating solution and the second coating solution are not limited to particular types.

Figure 3:
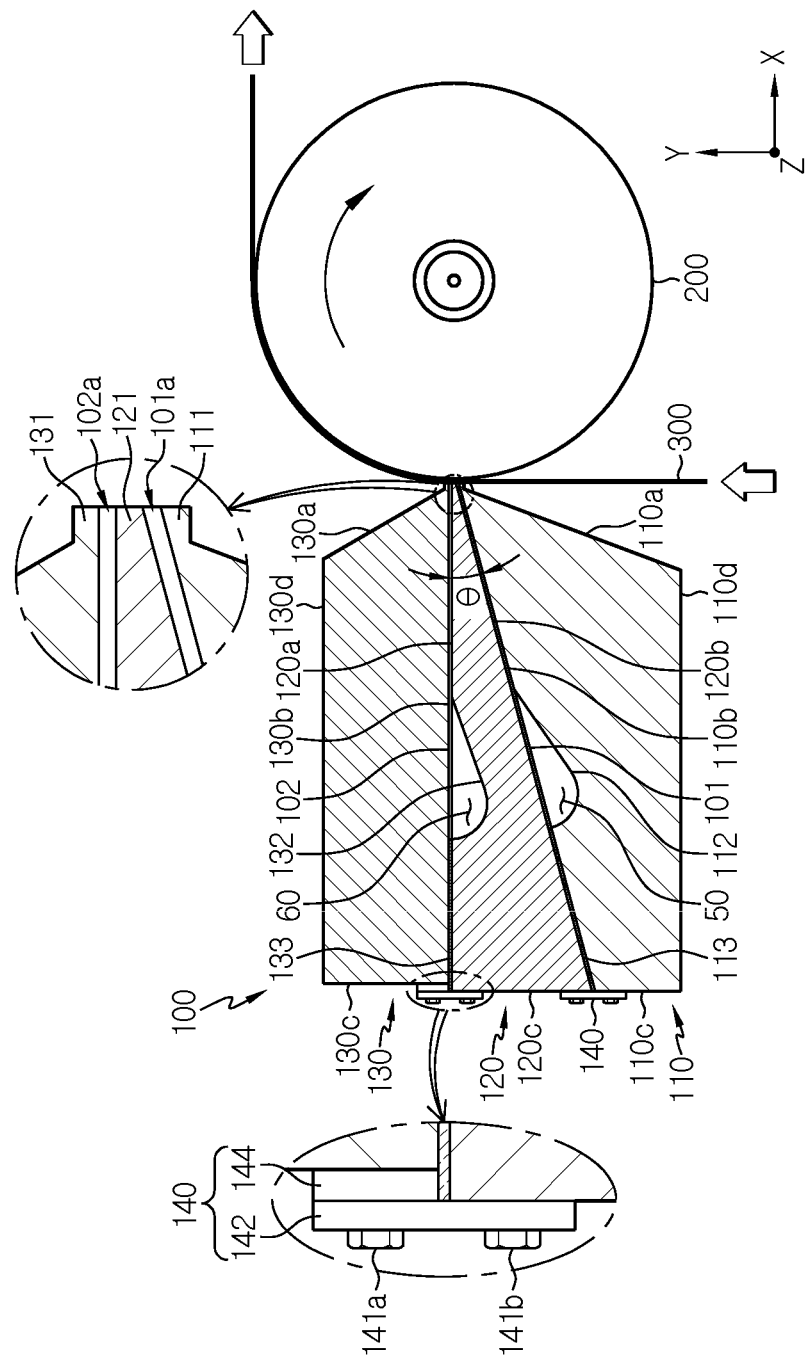
FIG. 3 is a schematic cross-sectional view of a multi-slot die coater according to an embodiment of the present disclosure.
Figure 4:
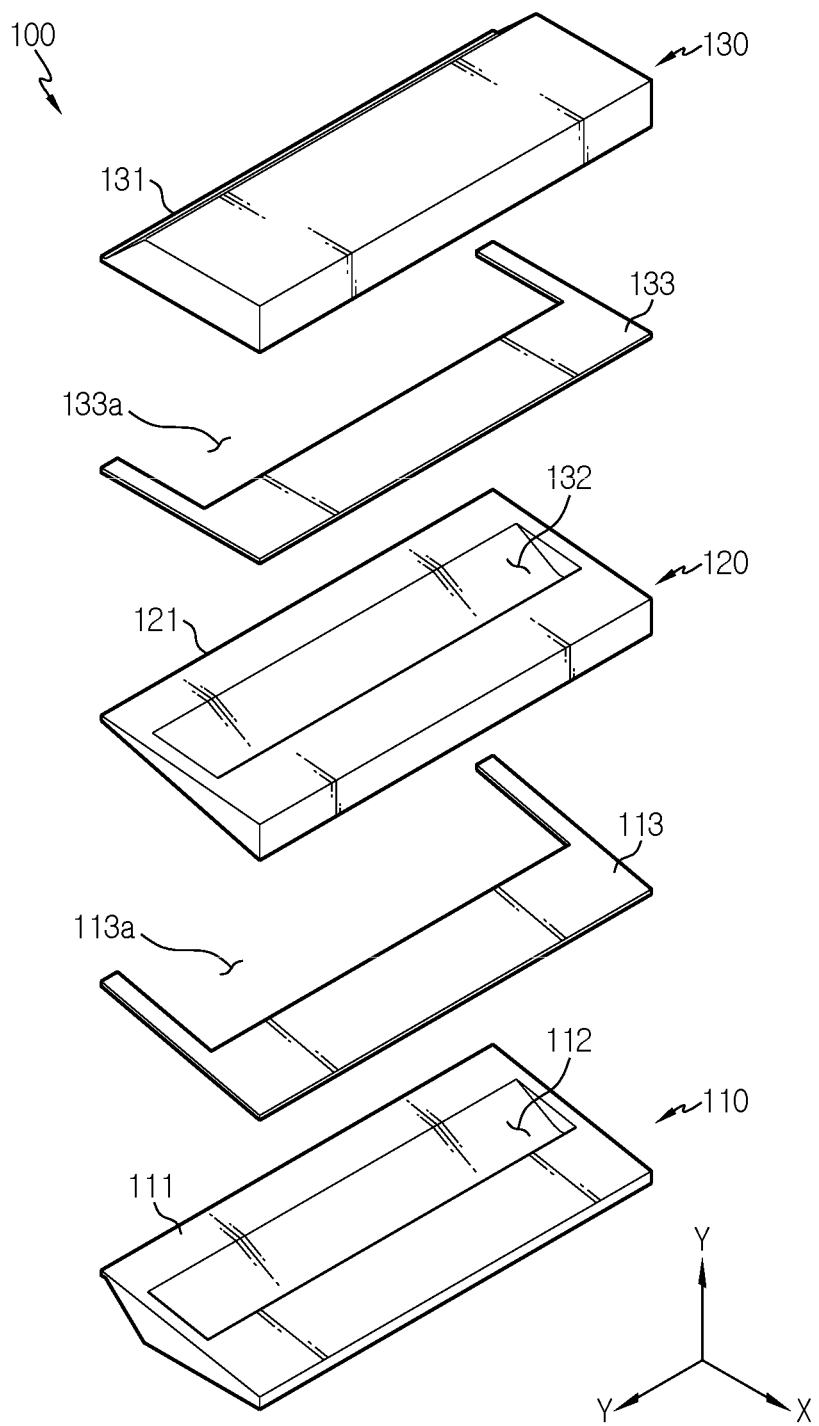
FIG. 4 is a schematic exploded perspective view of a multi-slot die coater according to an embodiment of the present disclosure.
Figure 5:
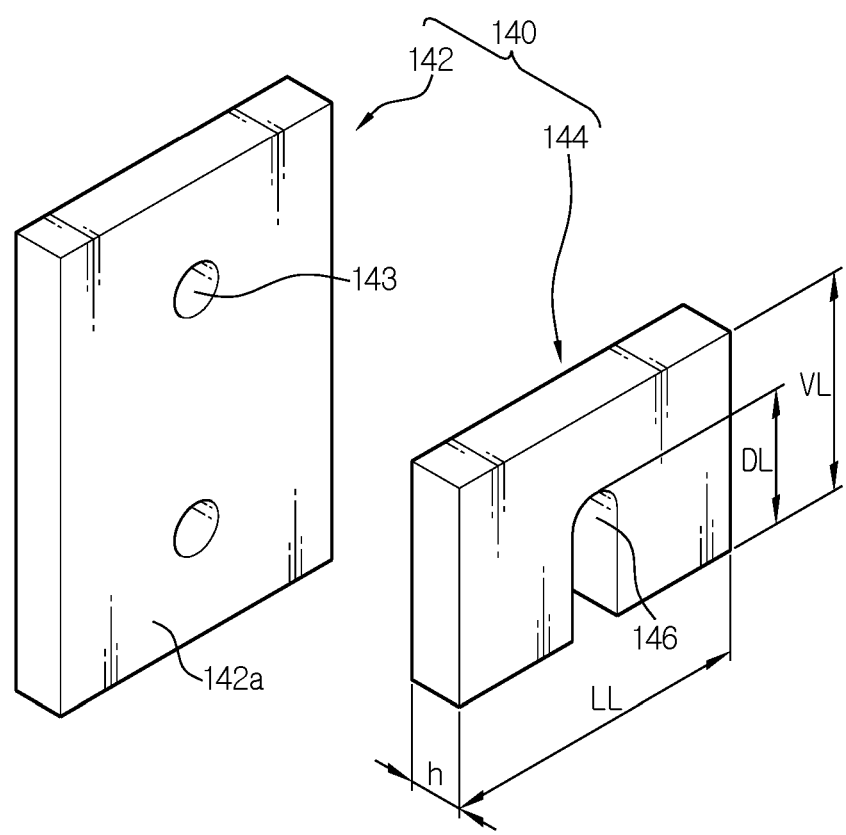
FIG. 5 is a perspective view of a fixing block included in the multi-slot die coater shown in FIG. 3.
Figure 6:
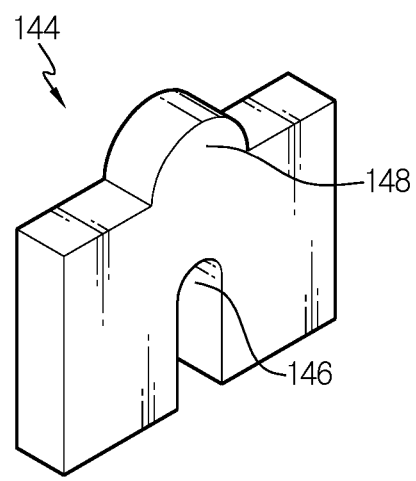
FIG. 6 shows another example of the step adjustment block shown in FIG. 5.
Figure 7:
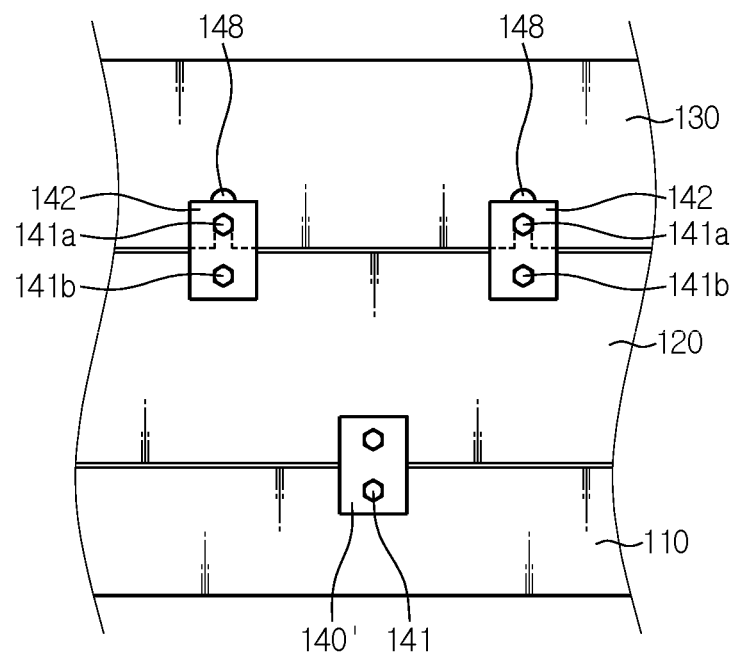
FIG. 7 is a rear view of a multi-slot die coater according to an embodiment of the present disclosure.

FIG. 3 is a schematic cross-sectional view of the multi-slot die coater according to an embodiment of the present disclosure, and FIG. 4 is a schematic exploded perspective view of the multi-slot die coater according to an embodiment of the present disclosure. FIG. 5 is a perspective view of a fixing block included in the multi-slot die coater shown in FIG. 3. FIG. 6 shows another example of a step adjustment block shown in FIG. 5. FIG. 7 is a rear view of the multi-slot die coater according to an embodiment of the present disclosure.

The multi-slot die coater 100 according to an embodiment of the present disclosure is a dual slot die coater including a lower slot 101 and an upper slot 102, and is an apparatus capable of simultaneously or alternately coating a same type of coating solution or two different types of coating solutions on a substrate 300 through the lower slot 101 and the upper slot 102. Referring to FIGS. 3 and 4, the multi-slot die coater 100 includes a lower die block 110, an intermediate die block 120 positioned on or adjacent to the lower die block 110, and an upper die block 130 positioned on or adjacent to the intermediate die block 120. It should be noted that the lower die block 110 and the upper die block 130 may be referred to as the first outer die block and the second outer die block, respectively, as they are disposed outward of the intermediate block.

In FIG. 3, the multi-slot die coater 100 is installed such that a direction (X direction) in which the coating solution or the active material slurry emerges is almost horizontal (approximately: ±5°), and may optionally be horizontal.

The intermediate die block 120 is a block disposed in the middle of the blocks of the multi-slot die coater 100, and is a block interposed between the lower die block 110 and the upper die block 130 to form a multi-slot. The intermediate die block 120 of this embodiment is a right triangle in cross section, but its shape is not necessarily limited thereto, and for example, the intermediate die block 120 may be an isosceles triangle in cross section.

A first surface 120a where the intermediate die block 120 is in contact with the upper die block 130 is placed almost horizontally, and a surface 130d (that is, a surface that forms the upper surface of the outer peripheral surface of the multi-slot die coater 100) opposite a surface 130b where the upper die block 130 faces the first surface 120a is also placed almost horizontally. As described above, the first surface 120a and the opposite surface 130d are almost parallel to each other. Additionally, a surface 110d (that is, a surface that forms the lower surface of the outer peripheral surface of the multi-slot die coater 100) opposite a surface 110b where the lower die block 110 is in contact with the intermediate die block 120 is also placed almost horizontally, and this surface is a bottom surface 110d (X-Z plane).

The surfaces of the lower die block 110, the intermediate die block 120 and the upper die block 130 opposite the direction in which the active material slurry emerges, i.e., the rear surfaces 110c, 120c, and 130c, are placed almost vertically (Y direction).

Among the surfaces that form the outer peripheral surface of the multi-slot die coater 100 in the lower die block 110 and the upper die block 130 on the outermost side, the bottom surface 110d of the lower die block 110 and the top surface 130d of the upper die block 130 may be almost perpendicular to the rear surfaces 110c and 130c. Additionally, the first surface 120a of the intermediate die block 120 may be almost perpendicular to the rear surface 120c. In the die blocks 110, 120, and 130, since corners at which sides meet are right-angled, a right angle portion in cross section exists, and a vertical or horizontal surface may be used as a reference surface, and thus it is easy to manufacture or handle and it is possible to ensure precision. In addition, when combined together, the lower die block 110, the intermediate die block 120 and the upper die block 130 have approximately a rectangular parallelepiped shape as a whole, and are inclined toward the substrate 300 only at the front side where the coating solution emerges (see the surface 130a of the upper die block 130, the surface 110a of the lower die block 110). The shape after assembly is approximately similar to that of a slot die coater including a single slot (for example, 30 of FIG. 1), so it is possible to share a slot die coater stand or the like.

The lower die block 110, the intermediate die block 120 and the upper die block 130 are not necessarily limited thereto, and for example, may be configured as a vertical die such that the direction in which the electrode active material slurry emerges is an upper direction and the rear surfaces 110c, 120c, and 130c are bottom surfaces.

The die blocks 110, 120, and 130 are made of, for example, a SUS material. Materials that are easy to process, such as SUS420J2, SUS630, SUS440C, SUS304, and SUS316L, may be used. The SUS is easy to process and low-priced, has high corrosion resistance, and can be formed in a desired shape at low cost.

The lower die block 110 is the lowermost block among the blocks of the multi-slot die coater 100, and the surface 110b facing the intermediate die block 120 is inclined at an angle of approximately 20° to 60° relative to the bottom surface 110d.

The lower slot 101 may be formed at a location in which the lower die block 110 and the intermediate die block 120 are in contact with each other. For example, a first spacer 113 is interposed between the lower die block 110 and the intermediate die block 120 to form a gap between, and the lower slot 101 corresponding to a passage through which the first coating solution 50 may flow may be formed. In this case, the thickness of the first spacer 113 determines the vertical width (Y-axis direction, the slot gap) of the lower slot 101.

As shown in FIG. 4, the first spacer 113 has a first opening portion 113a which is cut at an area, and may be interposed in the remaining portion except one side in the edge area of the facing surface of each of the lower die block 110 and the intermediate die block 120. Accordingly, a lower exit port 101a through which the first coating solution 50 emerges is only formed between the front end of the lower die block 110 and the front end of the intermediate die block 120. The front end of the lower die block 110 and the front end of the intermediate die block 120 are defined as a lower die lip 111 and an intermediate die lip 121, respectively, and in other words, the lower exit port 101a is formed by the spacing between the lower die lip 111 and the intermediate die lip 121.

For reference, the first spacer 113 acts as a gasket to prevent the leakage of the first coating solution 50 through the gap between the lower die block 110 and the intermediate die block 120 except the area where the lower exit port 101a is formed, and thus the first spacer 113 is preferably made of a material having sealing ability.

The lower die block 110 includes a first manifold 112 having a predetermined depth on the surface 110b facing the intermediate die block 120, and the first manifold 112 is in communication with the lower slot 101. The first manifold 112 is a space formed from the surface 110b where the lower die block 110 is in contact with the intermediate die block 120 to the surface 110d opposite the surface 110b. The first manifold 112 is connected to a first coating solution supply chamber (not shown) installed outside with a supply pipe and is supplied with the first coating solution 50. When the first manifold 112 is fully filled with the first coating solution 50, the flow of the first coating solution 50 is guided along the lower slot 101 and comes out of the lower exit port 101a.

The upper die block 130 is positioned in contact with the first surface 120a which is the upper surface of the intermediate die block 120 in parallel to the bottom surface. As described above, the upper slot 102 is formed at a location in which the intermediate die block 120 and the upper die block 130 are in contact with each other.

In the same way as the lower slot 101 described above, a second spacer 133 may be interposed between the intermediate die block 120 and the upper die block 130 to form a gap therebetween. Accordingly, the upper slot 102 corresponding to a passage through which a second coating solution 60 may flow is formed. In this case, the vertical width (Y-axis direction, the slot gap) of the upper slot 102 is determined by the second spacer 133.

In addition, the second spacer 133 having the similar structure to the first spacer 113 has a second opening portion 133a which is cut at an area, and is interposed in the remaining portion except one side in the edge area of the facing surface of each of the intermediate die block 120 and the upper die block 130. Likewise, the circumferential direction except the front side of the upper slot 102 is blocked, and the upper exit port 102a is only formed between the front end of the intermediate die block 120 and the front end of the upper die block 130. The front end of the upper die block 130 is defined as an upper die lip 131, and in other words, the upper exit port 102a is formed by the spacing between the intermediate die lip 121 and the upper die lip 131.

In addition, the intermediate die block 120 includes a second manifold 132 having a predetermined depth on the first surface 120a facing the upper die block 130, and the second manifold 132 is in communication with the upper slot 102. The intermediate die block 120 has a second surface 120b opposite the first surface 120a. The second surface 120b is a surface where the intermediate die block 120 is in contact with the lower die block 110. The second manifold 132 is a space provided from the first surface 120a to the second surface 120b. Although not shown in the drawings, the second manifold 132 is connected to a supply chamber for the second coating solution 60 installed outside with a supply pipe and is supplied with the second coating solution 60. When the second coating solution 60 is supplied from the external source along the supply pipe, and the second manifold 132 is fully filled with the second coating solution 60, the flow of the second coating solution 60 is guided along the upper slot 102 in communication with the second manifold 132 and comes out of the upper exit port 102a.

The upper slot 102 and the lower slot 101 form an angle, and the angle may be approximately 20° to 70°. The upper slot 102 and the lower slot 101 may intersect at one point, and the upper exit port 102a and the lower exit port 101a may be provided near the intersection point. Accordingly, the locations at which the first coating solution 50 and the second coating solution 60 emerge may be concentrated on approximately one point.

Meanwhile, an angle θ between the first surface 120a where the intermediate die block 120 is in contact with the upper die block 130 and the second surface 120b where the intermediate die block 120 is in contact with the lower die block 110 is preferably in the range in which a turbulence is not formed immediately after the active material slurry issuing through the upper exit port 102a and the active material slurry issuing through the lower exit port 101a emerge out at the same time. When the angle θ is too small, the intermediate die block 120 is too thin and very vulnerable to deformation and twist.

According to the multi-slot die coater 100 having such a configuration, a rotatable coating roll 200 is positioned on the front side of the multi-slot die coater 100, and the coating roll 200 may be rotated to move the substrate 300 to be coated, while continuously contacting the first coating solution 50 and the second coating solution 60 with the surface of the substrate 300, and thereby the substrate 300 may be coated in a double layer. Alternatively, pattern coating may be intermittently formed on the substrate 300 by performing the supply and stop of the first coating solution 50 and the supply and stop of the second coating solution 60 in an alternating manner.

Here, the multi-slot die coater further includes a fixing block 140 on the rear surfaces 110c, 120c, 130c of the die blocks 110, 120, 130 on the side opposite the front end, and the fixing block 140 is fastened to the rear surfaces of any two of the die blocks 110, 120, 130 using bolts 141a, 141b to couple the two die blocks. The fixing block 140 includes a flat plate-shaped block 142 having a reference plane in close contact with the rear surface of any one of the two die blocks, and a step adjustment block 144 that may be mounted/demounted between the rear surface of the other die block and the flat plate-shaped block 142 and having a sufficient thickness to form a step between the rear surfaces of the two die blocks coupled to the fixing block 140 when mounted.

As shown in FIG. 5, the fixing block 140 includes the flat plate-shaped block 142 having the reference plane 142a in close contact with the rear surface of any one of the two die blocks, in this embodiment, the rear surface 120c of the intermediate die block 120. Additionally, the fixing block 140 has the step adjustment block 144 provided at the front end with respect to the reference plane 142a, and the step adjustment block 144 may be mounted/demounted. The step adjustment block 144 has a thickness h, and forms the step as much as the thickness between the rear surfaces 130c, 120c of the two die blocks 130, 120 coupled to the fixing block 140. The fixing block 140 may be made of a SUS material.

The fixing block 140 may further include holes 143 through which the bolts 141a, 141b pass for fastening with the bolts 141a, 141b. The number and position of the holes 143 may be changed from as shown. In this embodiment, the flat plate-shaped block 142 has the reference plane 142a in close contact with the rear surface 120c of the intermediate die block 120, and is fastened to the rear surface 120c of the intermediate die block 120 through the bolt 141b and the upper die block 130 through the bolt 141a.

In this embodiment, the step adjustment block 144 is mounted between the upper die block 130 and the flat plate-shaped block 142. To this end, the step adjustment block 144 is preferably a plate-shaped member having a groove 146 recessed from the lower surface in a direction perpendicular to the thickness-wise direction so that the bolt 141a fastened to the flat plate-shaped block 142 is inserted into the groove 146. Through this configuration, it is easy to mount/dismount the step adjustment block 144 by pushing the groove 146 down from above the bolt 141a or pulling out in the opposite direction. In this instance, the groove 146 may be pushed up from below the bolt 141a or pulled out in the opposite direction, and the groove 146 may be pushed from the side of the bolt 141a or pulled out in the opposite direction. With the bolt 141a inserted into the groove 146, the step adjustment block 144 is in close contact between the flat plate-shaped block 142 and the rear surface 130c of the upper die block 130, thereby eliminating the separation risk while in use.

The plurality of bolts 141a, 141b fastened to the flat plate-shaped block 142 may be provided along the horizontal or vertical direction of the flat plate-shaped block 142. In this case, an example is taken, in which the step adjustment block 144 may fit over the at least one of the bolts 141a. In this embodiment, the step adjustment block 144 has a size corresponding to each bolt 141a. The size (for example, the horizontal length LL, vertical length VL) of the step adjustment block 144 may be changed.

The groove 146 is preferably designed such that the center of mass of the step adjustment block 144 is stable to prevent the step adjustment block 144 from rotating in place without tightening the bolt 141a after inserting the bolt 141a into the groove 146. The groove 146 may be sufficiently deep to accommodate the bolt 141a therein. For example, the depth DL of the groove 146 may be such that the groove 146 is such that the groove 146 is formed up to the center of the vertical length VL of the step adjustment block 144. In the design, the vertical length VL of the step adjustment block 144 and the depth DL of the groove 146 are reflected to prevent the step adjustment block 144 from intruding into the intermediate die block 120 when the bolt 141a is inserted into the groove 146.

A cross section running across the step adjustment block 144 and the reference plane 142a in the fixing block 140 may include a first cross section portion and a second cross section portion extending perpendicular to the first cross section portion. For example, the cross section has a '¬' shape or 'L' shape. As the flat plate-shaped block 142 and the step adjustment block 144 have the simple block shape, this does not make processing complex, and achieves precise processing. Additionally, in the same way as the die blocks 110, 120, 130, also in the fixing block 140, since corners at which sides meet are right-angled, a right angle portion in cross section exists, and a vertical or horizontal plane may be used as a reference plane, and thus it is easy to manufacture or handle and it is possible to ensure precision. Additionally, when the lower die block 110, the intermediate die block 120 and the upper die block 130 are combined together and the fixing block 140 is fastened thereto, the contacted portions may support each other with high surface contact, and thus it is very good to fasten and fix and maintain.

The multi-slot die coater may be usually made of a SUS material. In general, since liquid leakage easily occurs in the coupling surface of the SUS assembly, a rubber ring or any other flexible material may be placed between the components to form a seal, thereby suppressing leakage. However, this sealing method is not suitable for controlling the uniform assembly (for example, an assembly deviation of less than 10 μm), so it is difficult to apply to the multi-slot die coater.

By this reason, the multi-slot die coater needs to assemble the die blocks processed with very high precision (straightness, flatness±5 μm) by bolt fastening. Since it is necessary to prevent liquid leakage, the bolt fastening is high pressure of about 200~350N. However, the high pressure bolt fastening may cause a non-uniform microscale distribution of stress, resulting in deformation of the block die, and the die block is deformed or twisted by the pressure of the coating solution supplied when coating. The cross section of the fixing block 140, for example, of a '¬' or 'L' shape, including the first cross section portion and the second cross section portion extending perpendicular to the first cross section portion by the flat plate-shaped block 142 and the step adjustment block 144 in combination is a structure that can withstand the high pressure bolt fastening.

In this embodiment, the fixing block 140 couples the upper die block 130 and the intermediate die block 120. Additionally, as the step adjustment block 144 is mounted between the flat plate-shaped block 142 and the rear surface 130c of the upper die block 130 such that the step adjustment block 144 is in close contact with the rear surface 130c of the upper die block 130, the step is formed between the rear surfaces 130c, 120c of the two die blocks 130, 120 coupled to the fixing block 140. Here, as the size of the step corresponds to the thickness h of the step adjustment block 144, the step between the rear surfaces 130c, 120c of the two die blocks 130, 120 may be adjusted by adjusting the thickness h of the step adjustment block 144. The step formed between the rear surfaces 130c, 120c of the two die blocks 130, 120 determines the position of the upper die lip 131 and the intermediate die lip 121 at the front end of each die block 130, 120, and it affects the coating gap.

The step adjustment by the mounting/dismounting of the step adjustment block 144 is an on/off method. When the step adjustment block 144 is mounted, the step is formed. When the step adjustment block 144 is demounted, there is no step. Usually, the coating gap adjustment range required when coating the active material slurry is a very small range of approximately 10 μm to 300 μm. To artificially adjust the coating gap, it is very difficult to change the bolt 141 fastening force or move the die blocks until an accurate target value is reached. According to the present disclosure, the predefined step may be formed by the on/off method through mounting/demounting of the step adjustment block 144 selected from different types of step adjustment blocks 144 having the fixed thickness h in the range of 10 μm to 300 μm, thereby improving the accuracy in coating gap adjustment.

An appropriate range of the coating gap may be set according to the type of the active material slurry. The present disclosure provides different types of step adjustment blocks having the suitable thickness and performs the process by replacing the step adjustment block necessary for each production process, and thus it is possible to use the multi-slot die coater for general purpose without including each multi-slot die coater dedicated to each active material slurry to use different types of active material slurries. Furthermore, it is possible to achieve a desired coating gap only by selecting the step adjustment block 144 having a desired thickness and fitting it over the bolt 141 without needing to remove the bolt 141 coupled to the flat plate-shaped block 142. Additionally, when there is dispersion in the active material slurry, it is possible to quickly respond to the dispersion by immediately replacing only the step adjustment block 144 to adjust the coating gap.

Accordingly, according to the present disclosure, there is no need to disassemble and re-assemble the die blocks which are structurally vulnerable due to their small thickness when adjusting the coating gap, and it is possible to always maintain the uniform coating gap by simple manipulation of coupling the die blocks to the fixing block 140 and straightforward mounting/dismounting of the step adjustment block 144. In addition, the fixing block 140 can reliably achieve uniform widthwise gap control through the large surface contact of the means such as the block.

As shown in FIG. 6, another example of the step adjustment block 144 may include a handle 148 used when mounting/dismounting on the upper surface of the plate-shaped member. The handle 148 may be a protruding part that extends outward from one side of the step adjustment block 144. Preferably, the handle 148 is formed opposite the groove 146. The operator may hold the handle 148 and push the groove 146 of the step adjustment block 144 down from above the bolt 141 or pull out in the opposite direction, which makes it easy to handle.

Meanwhile, the multi-slot die coater 100 may further include a flat plate-shaped fixing portion 140' fastened to the rear surface 120c of the intermediate die block 120 and the rear surface 110c of the lower die block 110 using the bolt 141. As shown in FIG. 7, a plurality of fixing blocks 140 may be provided along the widthwise direction of the multi-slot die coater 100. The bolts 141a, 141b are fastened to the fixing block 140, and through this, the intermediate die block 120 and the upper die block 130 are assembled. The flat plate-shaped fixing portion 140' may be provided between two fixing blocks 140. The bolt 141 is fastened to the flat plate-shaped fixing portion 140', and through this, the intermediate die block 120 and the lower die block 110 are assembled. In another example, the fixing block 140 may be provided between two flat plate-shaped fixing portions 140', The fixing block 140 can reliably achieve uniform widthwise gap control through the large surface contact of the means such as the block.

The assembly sequence may be, for example, as follows. First, the upper die block 130 and the intermediate die block 120 are assembled through the bolts 141a, 141b fastening with the flat plate-shaped block 142. Subsequently, the intermediate die block 120 and the lower die block 110 are assembled through the bolt 141 fastening with the flat plate-shaped fixing portion 140'. When it is determined necessary for an appropriate coating gap to form a step between the rear surfaces 130c, 120c of the upper die block 130 and the intermediate die block 120, the bolt 141a connecting the flat plate-shaped block 142 to the upper die block 130 is removed, and the step adjustment block 144 is inserted in between the flat plate-shaped block 142 and the upper die block 130. Subsequently, the flat plate-shaped block 142 and the upper die block 130 are fastened using the bolt 141a to fix the step adjustment block 144 between them.

Alternatively, the step adjustment block 144 may be mounted without removing the bolt 141a. When assembling the upper die block 130 and the intermediate die block 120 through the bolts 141a, 141b fastening with the flat plate-shaped block 142, the bolt 141a is fastened with a sufficient clearance to mount the step adjustment block 144. That is, the bolt 141a is fastened with the clearance. When it is determined necessary for an appropriate coating gap to form a step between the rear surfaces 130c, 120c of the upper die block 130 and the intermediate die block 120, the step adjustment block 144 is inserted in between the flat plate-shaped block 142 and the upper die block 130 by pushing the groove 146 down from above the bolt 141a or inward from the side, without removing the bolt 141a connecting the flat plate-shaped block 142 to the upper die block 130. Disassembling is performed in the contrary order. That is, the step adjustment block 144 is separated, and then the flat plate-shaped block 142 is separated by removing the bolts 141a, 141b.

It may be determined necessary to form a step in the assembling step. In such a case, when assembling the upper die block 130 and the intermediate die block 120 through the bolts 141a, 141b fastening with the flat plate-shaped block 142, the flat plate-shaped block 142 and the step adjustment block 144 are fastened together using the bolts 141a, 141b.

Figure 8:
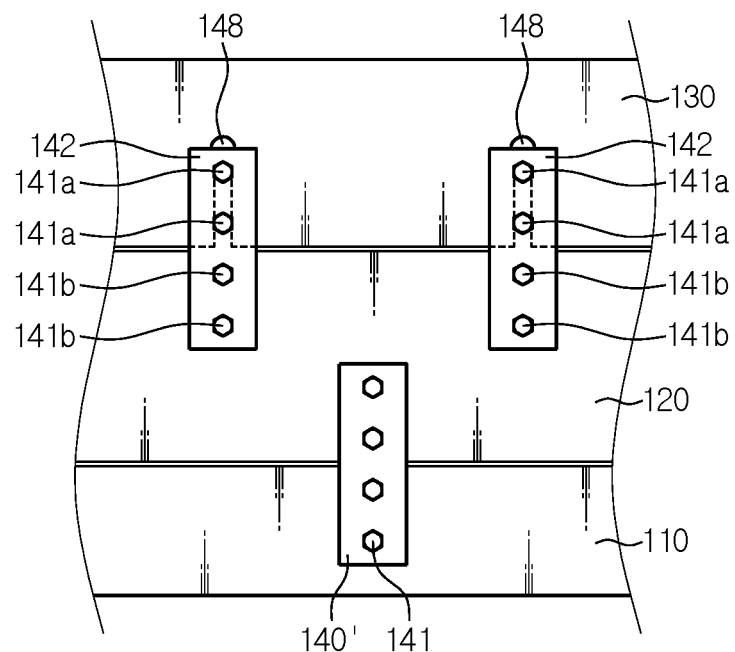
FIG. 8 is a variation of FIG. 7.

FIG. 8 is a variation of FIG. 7. Referring to FIG. 8, two bolts are fastened to each one die block perpendicular to the coupling surface of the upper die block 130 and the intermediate die block 120, and thus two bolts 141a are fastened to the upper die block 130 and two bolts 141b are fastened to the intermediate die block 120. In this instance, the depth of the groove 146 of the step adjustment block (see 144 of FIG. 6) is long enough to fit over the two bolts 141a.

The area of the thickness h of the step adjustment block 144 except the groove 146 around the bolt 141a over which the step adjustment block 144 is fit extends across the horizontal length and the vertical length of the step adjustment block 144. Accordingly, it is possible to have a sufficient contact area between the flat plate-shaped block 142 and the upper die block 130, and uniformly form the step. In addition, the step adjustment block 144 is a monolithic component, not divided into components around the bolt 141a. That is, the step adjustment block 144 is an integrally formed, seamless component. Accordingly, it is possible to improve the accuracy when assembling the flat plate-shaped block 142 and the step adjustment block 144, and ensure structural rigidity while handling and using and high stability against external impacts. In case that the step adjustment block 144 is not a monolithic component and includes at least two separate components, alignment of each component is considered when mounting each component around the bolt 141a, and after assembly of each component, the sum of tolerances is large.

When the step adjustment block 144 is fastened to the inclined portion, the advantage of the integrally formed step block 144 stands out. In case that the coupling surface of the upper die block 130 and the intermediate die block 120 is at an angle to the horizontal plane, it is very difficult to assemble the die blocks considering the alignment of separate components, not an integrally formed component. The step adjustment block 144 according to the present disclosure is integrally formed and thus it is easy to mount/dismount at the inclined portion.

As the upper die block 130 and the intermediate die block 120 are combined into one by the construction of the fixing block 140 and the intermediate die block 120 and the lower die block 110 are combined into one by the construction of the flat plate-shaped fixing portion 140', there is an effect that the upper die block 130 slides toward the substrate 300 with respect to the intermediate die block 120 especially at the interface between the upper die block 130 and the intermediate die block 120, i.e., the first surface 120a where the intermediate die block 120 is in contact with the upper die block 130 and the surface 130b where the upper die block 130 faces the first surface 120a. Accordingly, the relative position of the upper exit port 102a and the lower exit port 101a is adjusted, and the coating gap is determined accordingly. As opposed to the related art, the coating gap can be easily determined through the coupling of the die blocks 130, 120 with the fixing block 140. Additionally, when it is necessary to adjust the step, mounting/dismounting of the step adjustment block 144 may be used. Accordingly, it is possible to greatly reduce the inconvenience of disassembling the die blocks 130, 120, 110 and adjusting the position to adjust the coating gap each time.

This embodiment shows that the length of the upper die block 130 (the horizontal distance from the rear surface 130c to the upper die lip 131) is shorter than the length of the intermediate die block 120 and the lower die block 110 by way of illustration. In this state, when the step is formed in the upper die block 130 relative to the intermediate die block 120 as shown in FIG. 3, the lower die lip 111, the intermediate die lip 121 and the upper die lip 131 may be disposed on the same straight line. In this case, it is possible to achieve various film coating by moving back and forth the entire multi-slot die coater 100 with respect to the substrate 300.

According to this embodiment described above, the step is formed between the rear surfaces 130c, 120c of the die blocks 130, 120 through the fixing block 140 including the step adjustment block 144. That is, the die blocks are coupled using the bolts 141a, 141b fastened to the flat plate-shaped block 142, and when it is necessary to adjust the step between the die blocks, the step adjustment block 144 of the suitable thickness h to make the corresponding step may be additionally mounted between the flat plate-shaped block 142 and the die block to form the step. In this embodiment, the step adjustment block 144 is mounted between the upper die block 130 and the flat plate-shaped block 142 and the intermediate die block 120 is coupled to the flat plate-shaped block 142, and thus the step corresponding to the thickness h of the step adjustment block 144 may be naturally formed between the rear surfaces 130c, 120c of the die blocks 130, 120 by the coupling. Thereby, it is possible to always maintain the distance between the upper die lip 131 and the intermediate die lip 121 at the front end of the die blocks 130, 120 and the substrate 300, i.e., the coating gap at a desired level, and since the fixing block 140 is fixed between the die blocks 130, 120, once it is set, the coating gap does not change and is maintained during the process.

According to the present disclosure, it is possible to uniformly control the coating amount and the resultant coating quality by maintaining the uniform (±2%) coating gap even though considering that the die block is deformed by the pressure of the active material slurry coming out. Accordingly, it is possible to obtain coated products, especially, electrodes for secondary batteries, with uniform quality by using the multi-slot die coater having the uniform coating gap.

As described above, according to the present disclosure, it is possible to maintain the coating gap as adjusted, even when the pump pressure of the active material slurry increase. Accordingly, it is possible to ensure coating workability and reproducibility.

Using the multi-slot die coater, it is possible to uniformly form the coating layer, especially, the active material layer, to a desired thickness, and preferably, it is possible to simultaneously coat two types of electrode active material slurries, thereby achieving high performance and productivity.

In particular, when a plurality of fixing blocks 140 having the step adjustment block 144 is provided in the widthwise direction of the multi-slot die coater 100, it is possible to achieve precise control without widthwise coating gap deviation.

As described above, using the multi-slot die coater of the present disclosure, it is possible to achieve uniform coating under the high speed or wide coating condition when manufacturing electrodes of secondary batteries by coating the active material slurry on the current collector while moving the current collector.

Although this embodiment describes applying the coating solution in two layers or performing pattern coating by supplying the coating solution in an alternating manner, it is obvious that the present disclosure may include three or more slots to simultaneously coat in three or more layers. It is obvious that four or more die blocks are needed for three or more slots.

Subsequently, other embodiments of the present disclosure will be described with reference to FIGS. 9 to 17. The same reference numerals as the above-described embodiment denote the same elements, and overlapping descriptions of the same elements are omitted, and difference(s) from the above-described embodiment is mainly described.

Figure 9:
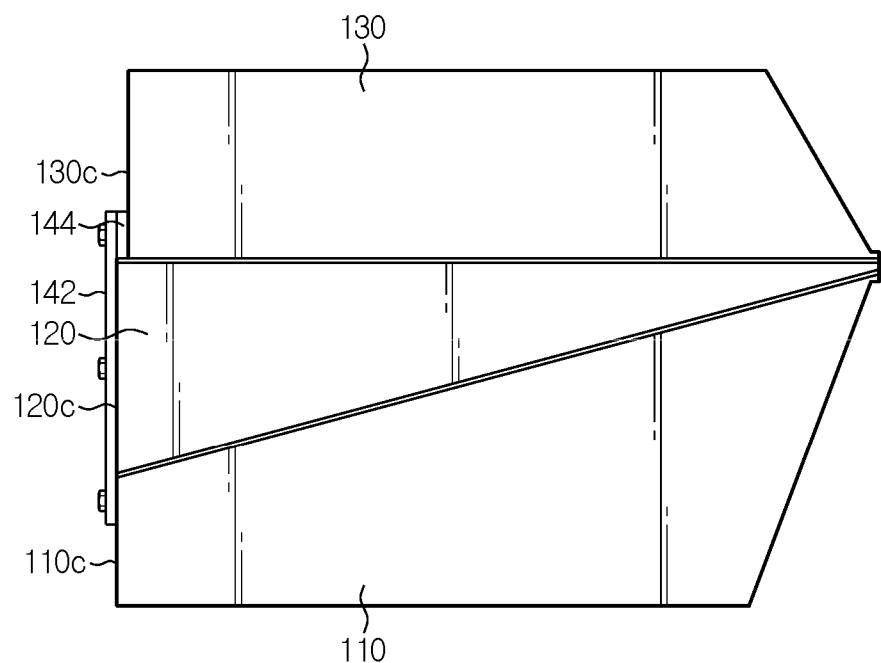
FIGS. 9 to 17 are schematic cross-sectional views of multi-slot die coaters according to other embodiments of the present disclosure.

The multi-slot die coater shown in FIG. 9 shows that the flat plate-shaped block 142 of the fixing block 140 shown and described in FIG. 3 is extended to the rear surface 110c of the lower die block 110 and thus the flat plate-shaped block 142 is also coupled to the rear surface 110c of the lower die block 110. In this case, the upper die block 130 and the intermediate die block 120 are coupled through the flat plate-shaped block 142 and the step is formed between the rear surfaces 130c, 120c of the upper die block 130 and the intermediate die block 120 by the step adjustment block 144, and besides, the lower die block 110 is also coupled to the flat plate-shaped block 142, and thus the multi-slot die coater may not include the flat plate-shaped fixing portion (see 140' of FIG. 7) fastened to the rear surface 120c of the intermediate die block 120 and the rear surface 110c of the lower die block 110) using the bolt 141, and may further include the flat plate-shaped fixing portion in the fixing block 140, if necessary.

Figure 10:
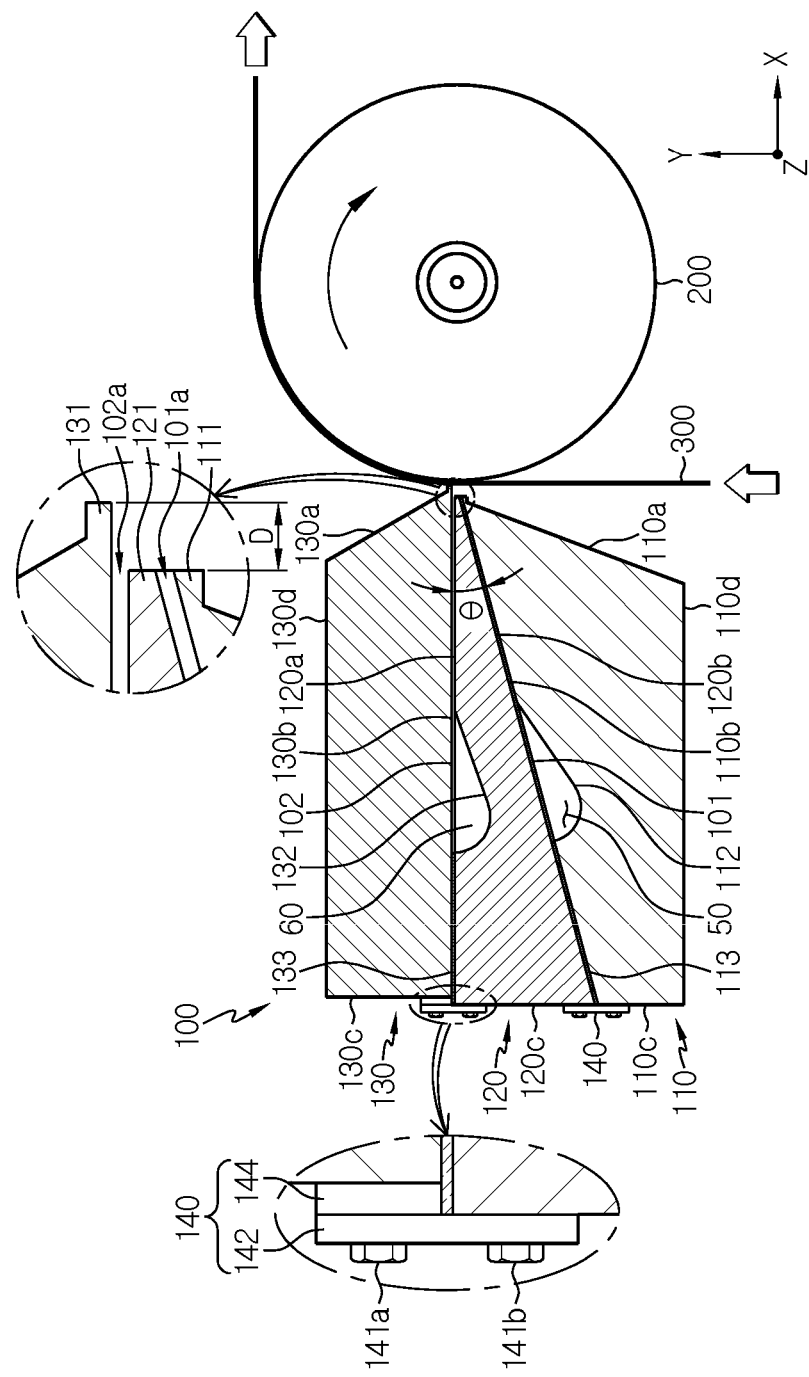

As opposed to the multi-slot die coater 100 of FIG. 3, the multi-slot die coater shown in FIG. 10 has the step D between the lower exit port 101a and the upper exit port 102a. When the length of the upper die block 130 (the horizontal distance from the rear surface 130c to the upper die lip 131) is equal to the length of the intermediate die block 120 and the lower die block 110, the upper die lip 131 may move further forward to the substrate 300 than the intermediate die lip 121 and the lower die lip 111 by the thickness h of the step adjustment block 144 of the fixing block 140. Thus, the step D between the lower exit port 101a and the upper exit port 102a may be equal to the thickness h of the step adjustment block 144 of the fixing block 140. When there is the step D between the lower exit port 101a and the upper exit port 102a, the lower exit port 101a and the upper exit port 102a are spaced apart from each other along the horizontal direction, thereby eliminating the risk that the second coating solution 60 issuing from the upper exit port 102a enters the lower exit port 101a or the first coating solution 50 issuing from the lower exit port 101a enters the upper exit port 102a.

That is, the coating solution issuing through the lower exit port 101a or the upper exit port 102a is blocked by the surface that forms the step formed between the lower exit port 101a and the upper exit port 102a and thus does not enter the other exit port, thereby achieving a more smooth multi-layer active material coating process.

Figure 11:
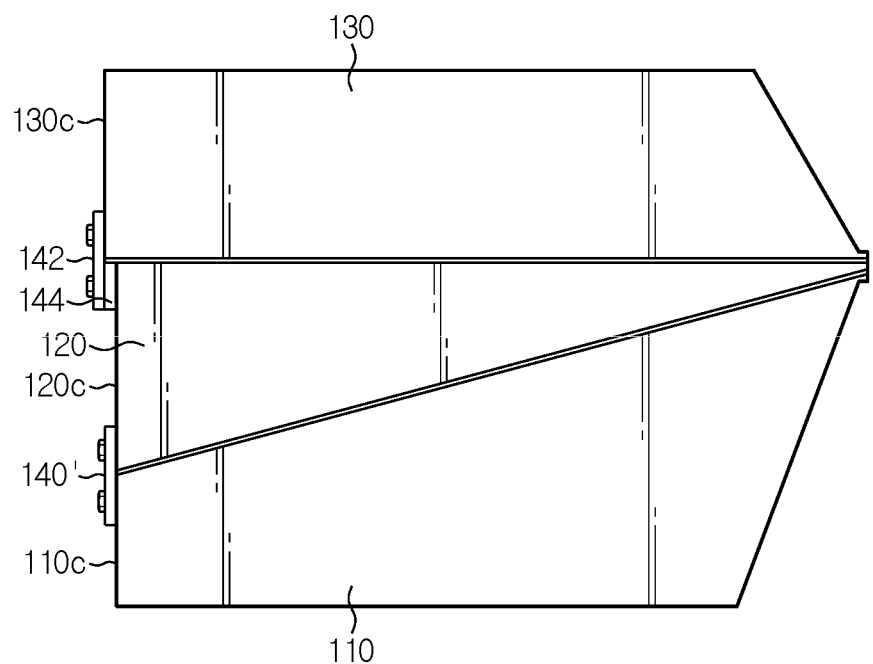

The step formed between the rear surface 130c of the upper die block 130 and the rear surface 120c of the intermediate die block 120 in FIG. 11 is the same as the multi-slot die coater 100 of FIG. 3, but as opposed to FIG. 3, the step adjustment block 144 of the fixing block 140 is in close contact with the rear surface 120c of the intermediate die block 120, not the rear surface 130c of the upper die block 130. As described above, when the step is formed between the rear surfaces 130c, 120c of the two die blocks 130, 120, the step adjustment block 144 of the fixing block 140 comes into close contact with the rear surface of any one of the two die blocks 130, 120, and the die block having the rear surface in close contact with the step adjustment block 144 moves forward to the substrate (see 300 of FIG. 3).

Figure 12:
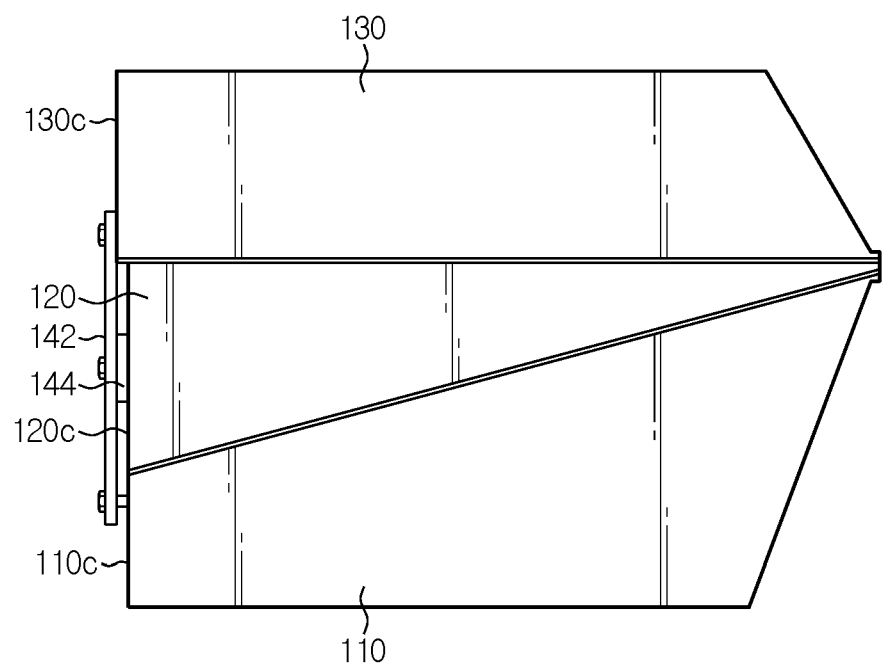

FIG. 12 is similar to FIG. 11, and shows that the flat plate-shaped block 142 of the fixing block 140 is simply extended to the rear surface 110c of the lower die block 110 and thus may be also coupled to the rear surface 110c of the lower die block 110.

The embodiments described above describe examples in which the step is formed between the rear surfaces 130c, 120c of the upper die block 130 and the intermediate die block 120. The step may be formed between any two of the die blocks 130, 120, 110.

Figure 13:
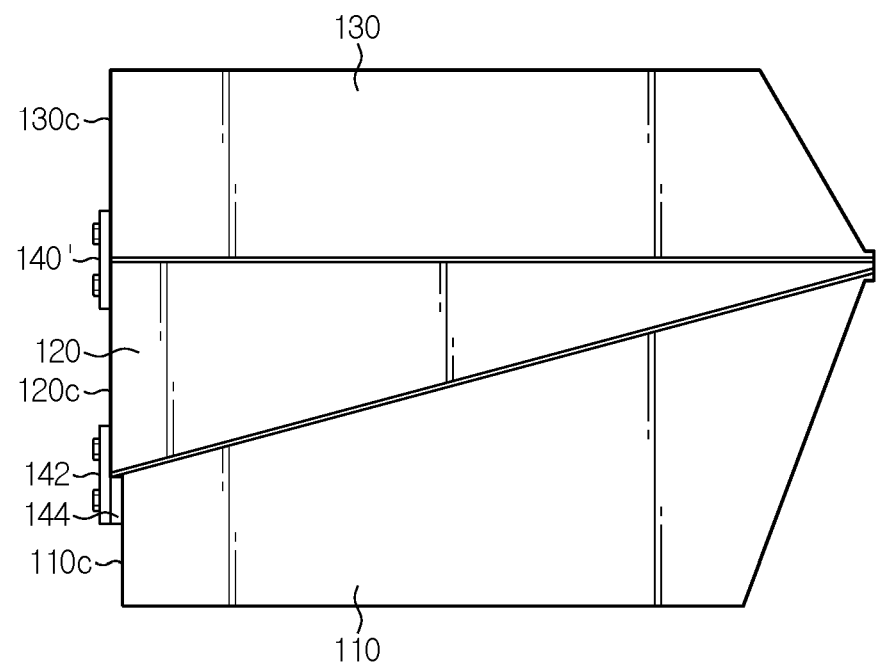
Figure 14:
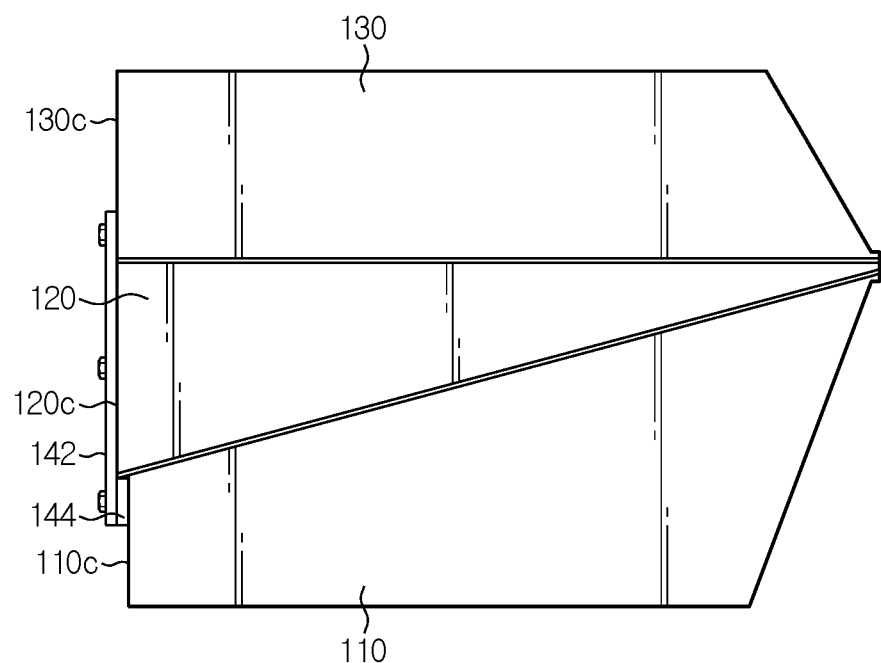

As such an example, FIGS. 13 and 14 show examples of the fixing block 140 in which the step may be formed between the intermediate die block 120 and the lower die block 110. In this example, when the length of the upper die block 130, the intermediate die block 120 and the lower die block 110 is equal, as opposed to FIG. 10, the lower exit port 101a moves further forward to the substrate (see 300 of FIG. 3) than the upper exit port 102a to form the step between the lower exit port 101a and the upper exit port 102a. In this instance, the lower die lip 111 on the downstream side in the movement direction of the substrate 300 is closer to the substrate 300 than the upper die lip 131 on the upstream side. Due to this feature, it is possible to uniformly adjust the thickness by applying pressure to the first coating solution 50 issuing from the lower exit port 101a by the lower die lip 111 and expanding the first coating solution 50 in the widthwise direction.

Figure 15:
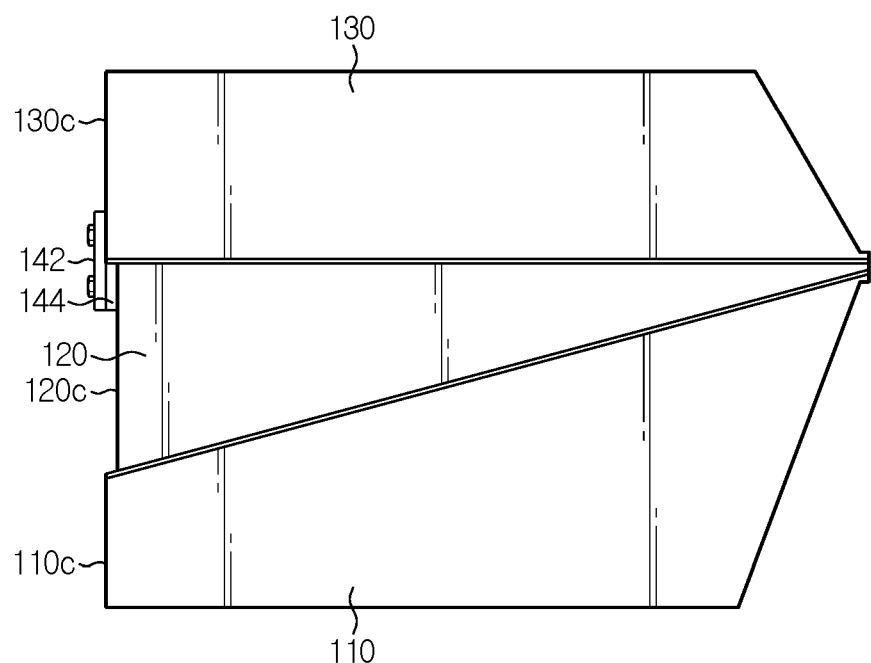
Figure 16:
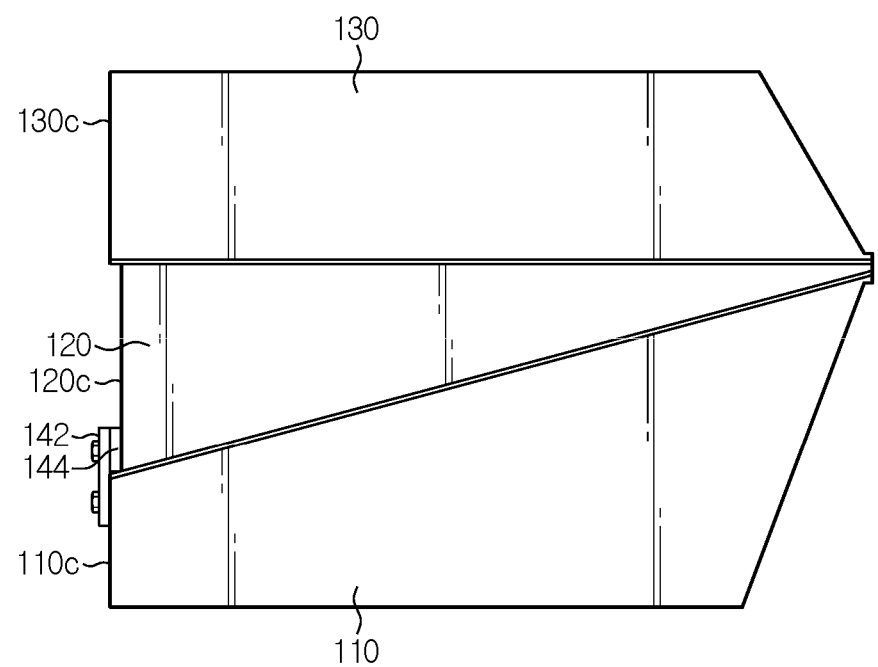
Figure 17:
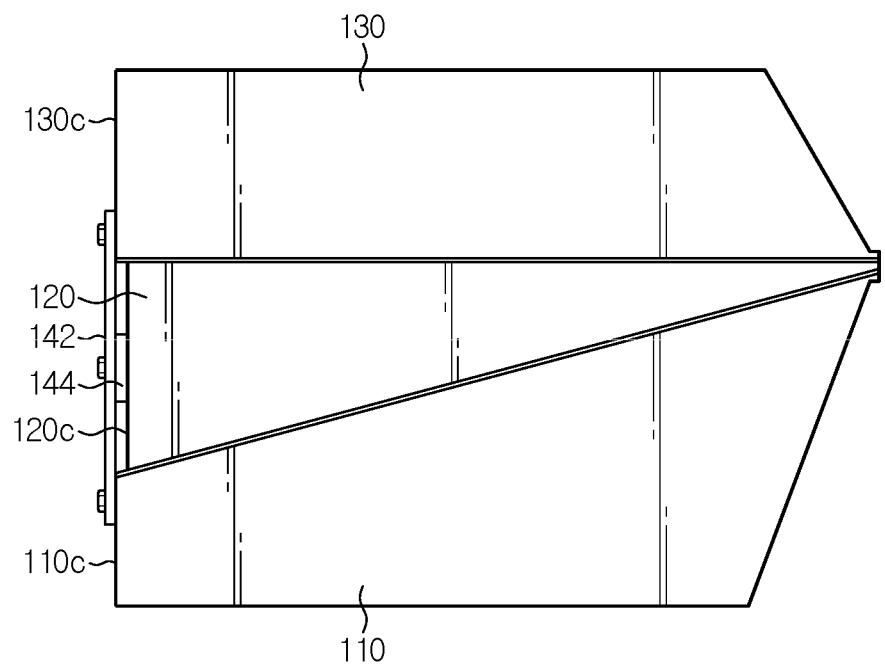

FIGS. 15 to 17 show examples of the fixing block 140 having the step so that the rear surface 120c of the intermediate die block 120 moves further forward to the substrate (see 300 of FIG. 3) than the rear surfaces 130c, 110c of the other die blocks 130, 110.

Figure 18:
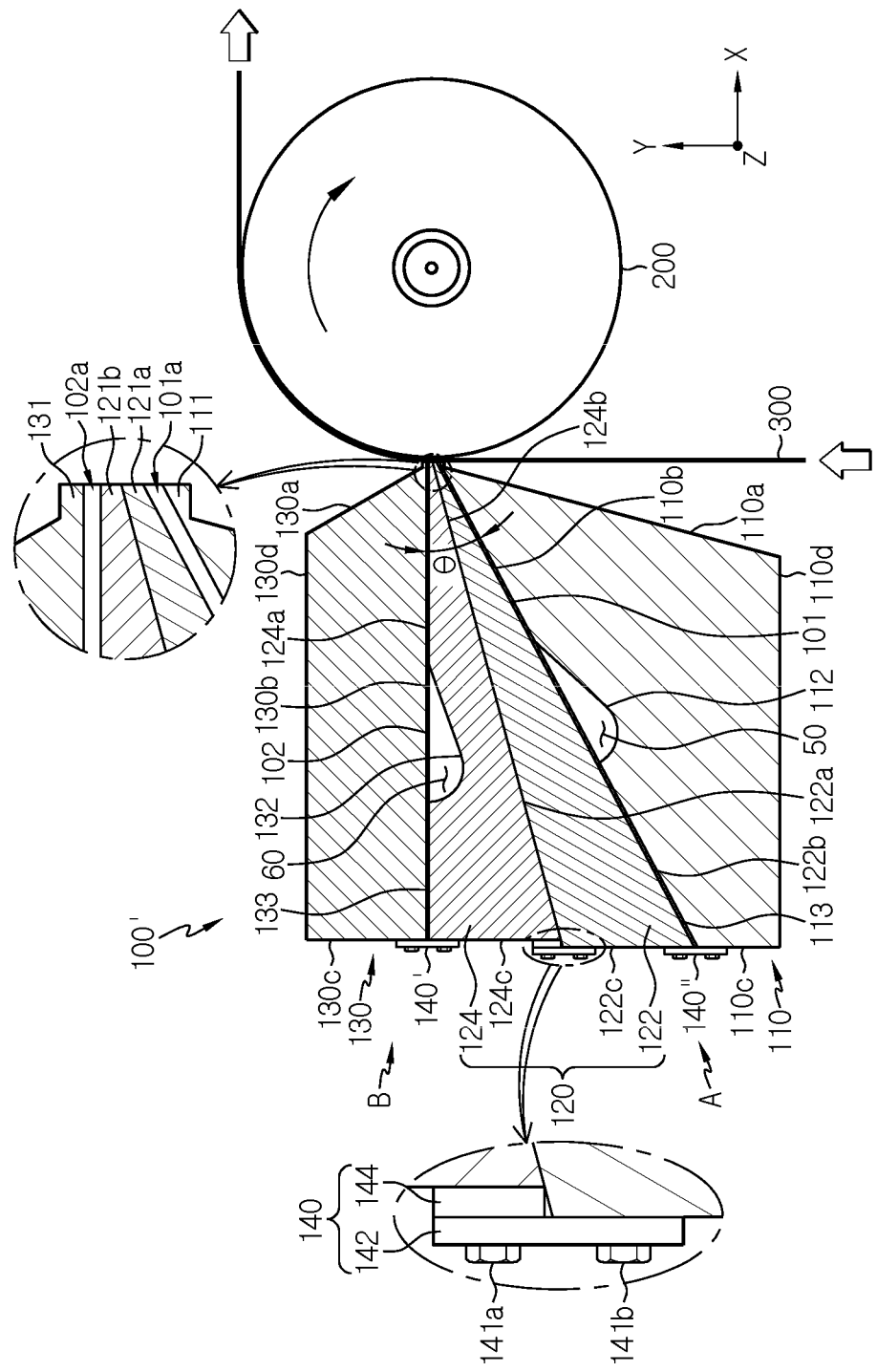
FIG. 18 is a schematic cross-sectional view of a multi-slot die coater according to another embodiment of the present disclosure.
Figure 19:
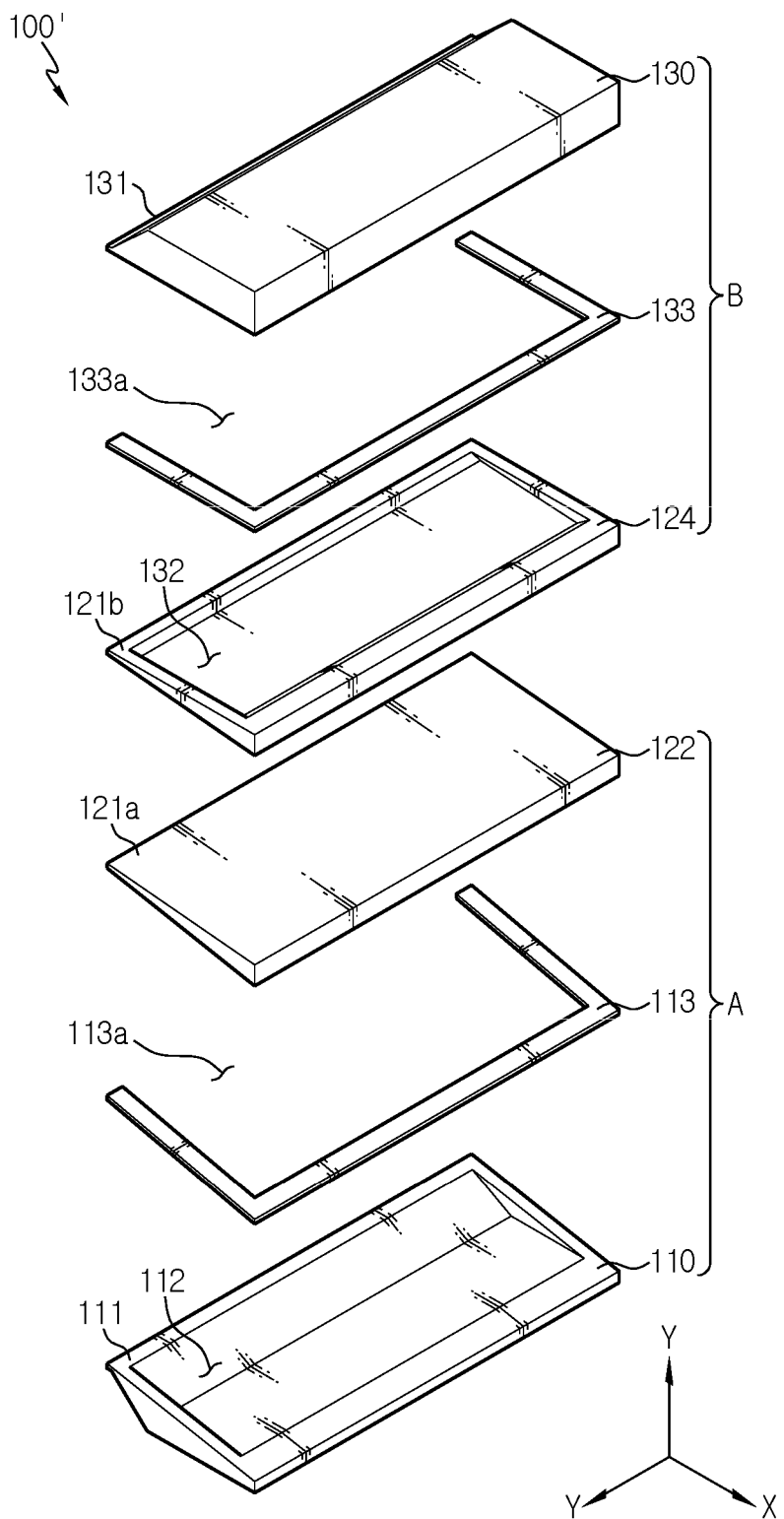
FIG. 19 is a schematic exploded perspective view of a multi-slot die coater according to another embodiment of the present disclosure.
Figure 20:
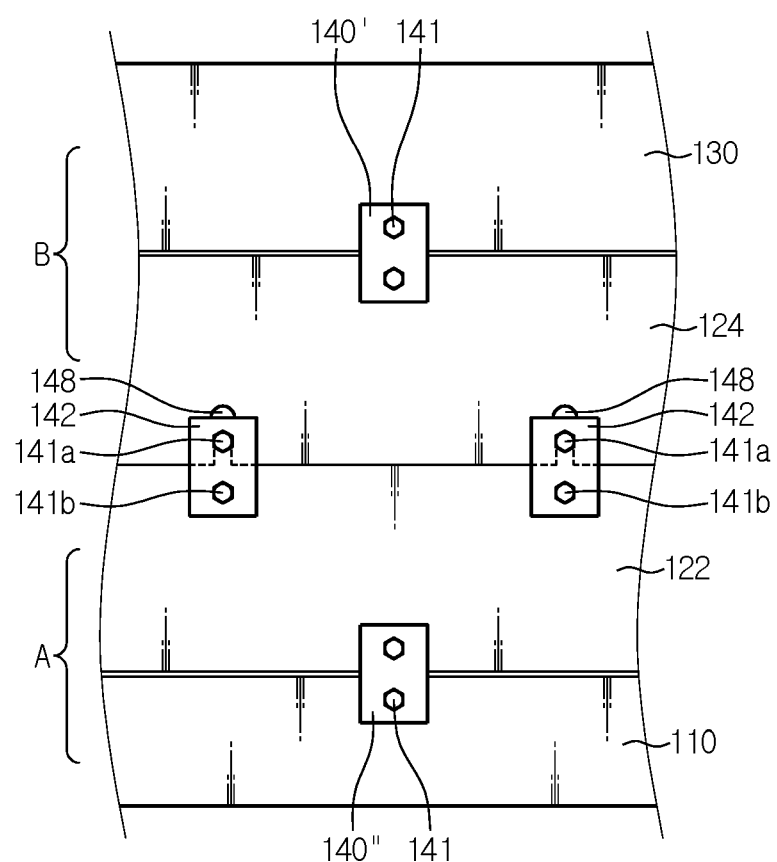
FIG. 20 is a rear view of a multi-slot die coater according to another embodiment of the present disclosure.

FIG. 18 is a schematic cross-sectional view of the multi-slot die coater according to another embodiment of the present disclosure. FIG. 19 is a schematic exploded perspective view of the multi-slot die coater according to another embodiment of the present disclosure. FIG. 20 is a rear view of the multi-slot die coater according to another embodiment of the present disclosure.

The multi-slot die coater 100' according to another embodiment of the present disclosure is a dual slot die coater including a lower slot 101 and an upper slot 102 to coat the same type of coating solution or two different types of coating solutions to the substrate 300 through the lower slot 101 and the upper slot 102 simultaneously or alternately. Referring to FIGS. 18 and 19, the multi-slot die coater 100' includes a lower die A and an upper die B positioned on the lower die A. The lower die A includes a lower die block 110, and a first intermediate die block 122 positioned on the lower die block 110. The first intermediate die block 122 has the lower slot 101 between the first intermediate die block 122 and the lower die block 110. The upper die B includes a second intermediate die block 124 installed on the first intermediate die block 122, and an upper die block 130 positioned on the second intermediate die block 124. The second intermediate die block 124 has the upper slot 102 between the second intermediate die block 124 and the upper die block 130.

In FIG. 18, the multi-slot die coater 100' is installed such that the direction (X direction) in which the active material slurry or the coating solution emerges is almost horizontal (almost: ±5°) and may optionally be horizontal. The first intermediate die block 122 and the second intermediate die block 124 form an intermediate die block 120. The intermediate die block 120 is a block in the middle of the blocks of the multi-slot die coater 100', and is positioned between the lower die block 110 and the upper die block 130. The intermediate die block 120 of this embodiment is in the shape of approximately a right-angled triangle in cross section, but is not necessarily limited thereto, and for example, may be provided in the shape of an isosceles triangle in cross section. In the intermediate die block 120, the first intermediate die block 122 and the second intermediate die block 124 are in contact with each other in the vertical direction, and make relative movement by sliding along the contact surface.

A first surface 124a where the second intermediate die block 124 is in contact with the upper die block 130 is placed substantially or almost horizontally and a second surface 124b opposite the first surface 124a in the second intermediate die block 124 is in close contact with a first surface 122a of the first intermediate die block 122, and relative movement is made along the contact surface between them. A second surface 122b opposite the first surface 122a in the first intermediate die block 122 is in contact with the lower die block 110.

The first surface 124a where the second intermediate die block 124 is in contact with the upper die block 130 is placed substantially or almost horizontally and a surface 130d (i.e., a surface that forms the upper surface of the outer peripheral surface of the multi-slot die coater 100') opposite a surface 130b facing the first surface 124a in the upper die block 130 is also placed substantially or almost horizontally. Accordingly, the first surface 124a and the opposite surface 130d are almost parallel. Additionally, a surface 110d (i.e., a surface that forms the lower surface of the outer peripheral surface of the multi-slot die coater 100') opposite the surface 110b where the lower die block 110 is in contact with the first intermediate die block 122 is also placed almost horizontally, and this surface is the bottom surface 110d (X-Z plane).

The surfaces opposite to the direction in which the active material slurry emerges in the lower die block 110, the first and second intermediate die blocks 122, 124 and the upper die block 130, i.e., the rear surfaces 110c, 122c, 124c, 130c are placed almost vertically (Y direction).

In the outermost die block, i.e., the lower die block 110 and the upper die block 130, among the surfaces that form the outer peripheral surface of the multi-slot die coater 100', the bottom surface 110d of the lower die block 110 and the top surface 130d of the upper die block 130 may be almost perpendicular to the rear surfaces 110c, 130c. Additionally, the first surface 124a of the second intermediate die block 124 may be substantially or almost perpendicular to the rear surface 124c. In the die blocks 110, 124, 130, since corners at which sides meet are right-angled, a right angle portion in cross section exists, and a vertical or horizontal plane may be used as a reference plane, and thus it is easy to manufacture or handle and possible to ensure precision. Additionally, when combined together, the lower die block 110, the first and second intermediate die blocks 122, 124 and the upper die block 130 have an approximately rectangular parallelepiped shape as a whole, and are inclined toward the substrate 300 only at the front side where the coating solution emerges (see the surface 130a of the upper die block 130, the surface 110a of the lower die block 110). The shape after assembly is approximately similar to a slot die coater (for example, 30 of FIG. 1) including a single slot, so it is possible to share a slot die coater support or the like.

The lower die block 110, the first and second intermediate die blocks 122, 124 and the upper die block 130 are not necessarily limited thereto, and for example, may be configured as a vertical die such that the direction in which the active material slurry emerges is an upper direction and the rear surfaces 110c, 122c, 124c, 130c are bottom surfaces.

The die blocks 110, 120, 130 are made of, for example, a SUS material. Materials that are easy to process, such as SUS420J2, SUS630, SUS440C, SUS304 and SUS316L, may be used. The SUS is easy to process and low-priced, has high corrosion resistance, and can be formed in a desired shape at low cost.

The lower die block 110 is the lowermost block among the blocks of the multi-slot die coater 100', and the surface 110b facing the first intermediate die block 122 is inclined at an angle of approximately 20 to 60° to the bottom surface 110d.

The lower slot 101 may be formed at a location in which the lower die block 110 and the first intermediate die block 122 are in contact with each other. For example, a first spacer 113 may be interposed between the lower die block 110 and the first intermediate die block 122 to provide a gap between them, and thus the lower slot 101 corresponding to a passage through which the first coating solution 50 may flow may be formed. In this case, the thickness of the first spacer 113 determines the vertical width (Y-axis direction, the slot gap) of the lower slot 101.

As shown in FIG. 19, the first spacer 113 has a first opening portion 113a which is cut at an area, and may be interposed in the remaining area except one side of the edge area of the facing surface of each of the lower die block 110 and the first intermediate die block 122. Accordingly, the lower exit port 101a through which the first coating solution 50 emerges is only formed between the front end of the lower die block 110 and the front end of the first intermediate die block 122. The front end of the lower die block 110 and the front end of the first intermediate die block 122 are defined as a lower die lip 111 and a first intermediate die lip 121a, respectively, and that is to say, the lower exit port 101a may be formed by the spacing between the lower die lip 111 and the first intermediate die lip 121a.

For reference, except the area in which the lower exit port 101a is formed, the first spacer 113 acts as a gasket to prevent the leakage of the first coating solution 50 through the gap between the lower die block 110 and the first intermediate die block 122, and thus is preferably made of a material having sealing ability.

The lower die block 110 includes a first manifold 112 having a predetermined depth on the surface 110b facing the first intermediate die block 122, and the first manifold 112 is in communication with the lower slot 101. The first manifold 112 is a space formed from the surface 110b where the lower die block 110 is in contact with the first intermediate die block 122 to the surface 110d opposite the surface 110b. The first manifold 112 is connected to a first coating solution supply chamber (not shown) installed outside with a supply pipe and is supplied with the first coating solution

50. When the first manifold 112 is fully filled with the first coating solution 50, the flow of the first coating solution 50 is guided along the lower slot 101 and comes out of the lower exit port 101a.

The upper die block 130 is positioned in contact with the first surface 124a which is the upper surface of the second intermediate die block 124 in parallel to the bottom surface. As described above, the upper slot 102 is formed at a location in which the second intermediate die block 124 and the upper die block 130 are in contact with each other.

In the same way as the lower slot 101 described above, a second spacer 133 may be interposed between the second intermediate die block 124 and the upper die block 130 to provide a gap between them. Accordingly, the upper slot 102 corresponding to a passage through which the second coating solution 60 may flow is formed. In this case, the vertical width (Y-axis direction, the slot gap) of the upper slot 102 is determined by the second spacer 133.

Additionally, the second spacer 133 has a similar structure to the first spacer 113 and includes a second opening portion 133a which is cut at an area, and is interposed in the remaining area except one side of the edge area of the facing surface of each of the second intermediate die block 124 and the upper die block 130. Likewise, the circumferential direction except the front side of the upper slot 102 is blocked and the upper exit port 102a is only formed between the front end of the second intermediate die block 124 and the front end of the upper die block 130. The front end of the second intermediate die block 124 is defined as a second intermediate die lip 121b and the front end of the upper die block 130 is defined as an upper die lip 131, and that is to say, the upper exit port 102a may be formed by the spacing between the second intermediate die lip 121b and the upper die lip 131.

Additionally, the second intermediate die block 124 includes a second manifold 132 having a predetermined depth on the first surface 124a facing the upper die block 130, and the second manifold 132 is in communication with the upper slot 102. The second intermediate die block 124 has a second surface 124b facing the first surface 120a. The second surface 124b is a surface where the second intermediate die block 124 is in contact with the first intermediate die block 122. The second manifold 132 is a space formed from the first surface 124a to the second surface 124b. Although not shown in the drawings, the second manifold 132 is connected to a supply chamber for the second coating solution 60 installed outside with a supply pipe and is supplied with the second coating solution 60. When the second coating solution 60 is supplied from the external source along the supply pipe and the second manifold 132 is fully filled with the second coating solution 60, the flow of the second coating solution 60 is guided along the upper slot 102 in communication with the second manifold 132 and comes out of the upper exit port 102a.

The upper slot 102 and the lower slot 101 form an angle, and the angle may be approximately 20° to 70°. The upper slot 102 and the lower slot 101 may intersect at one point, and the upper exit port 102a and the lower exit port 101a may be provided near the intersection point. Accordingly, the locations at which the first coating solution 50 and the second coating solution 60 emerge may be concentrated on approximately one point.

Meanwhile, an angle θ between the first surface 124a where the second intermediate die block 124 is in contact with the upper die block 130 and the second surface 122b where the first intermediate die block 122 is in contact with the lower die block 110 is preferably in the range in which a turbulence is not formed immediately after the active material slurry issuing from the upper exit port 102a and the active material slurry issuing from the lower exit port 101a emerge out at the same time. When the angle θ is too small, the intermediate die block 120 is too thin and very vulnerable to deformation and twist.

According to the multi-slot die coater 100' having such a configuration, a rotatable coating roll 200 is positioned on the front side of the multi-slot die coater 100', and the coating roll 200 may be rotated to move the substrate 300 to be coated, while continuously contacting the first coating solution 50 and the second coating solution 60 with the surface of the substrate 300, and thereby the substrate 300 may be coated in a double layer. Alternatively, pattern coating may be intermittently formed on the substrate 300 by performing the supply and stop of the first coating solution 50 and the supply and stop of the second coating solution 60 in an alternating manner.

In addition, the multi-slot die coater further includes a fixing block 140 fastened to the rear surface 110c, 122c, 124c, 130c of the die blocks 110, 122, 124, 130 on the opposite side to the front end of the lower die A and the upper die B using the bolts 141a, 141b to couple the lower die A and the upper die B.

The fixing block 140 includes a flat plate-shaped block 142 having the reference plane in close contact with the rear surface of any one of the lower die A and the upper die B, and a step adjustment block 144 which may be mounted/demounted between the rear surface of the other die block and the flat plate-shaped block 142, and having a sufficient thickness to form a step between the rear surfaces of the two die blocks coupled to the fixing block 140 when mounted.

The detailed description of the fixing block 140 is the same as the description made with reference to FIG. 5.

The fixing block 140 may further include holes 143 through which the bolts 141a, 141b pass for fastening with the bolts 141a, 141b. The number and position of the holes 143 may be changed as shown. In this embodiment, the flat plate-shaped block 142 has the reference plane 142a in close contact with the rear surface 120c of the first intermediate die block 122, and is fastened to the rear surface 120c of the first intermediate die block 122 through the bolt 141b and the second intermediate die block 130 through the bolt 141a.

In this embodiment, the step adjustment block 144 is mounted between the second intermediate die block 124 and the flat plate-shaped block 142. To this end, the step adjustment block 144 is preferably a plate-shaped member having a groove 146 recessed from the lower surface in a direction perpendicular to the thickness-wise direction to fit over the bolt 141a fastened to the flat plate-shaped block 142. Through this configuration, it is easy to mount/demount the step adjustment block 144 by pushing the groove 146 down from above the bolt 141a or pulling out in the opposite direction. In this instance, the groove 146 may be pushed up from below the bolt 141a or pulled out in the opposite direction, and the groove 146 may be pushed from the side of the bolt 141a or pulled out in the opposite direction. With the bolt 141a inserted into the groove 146, the step adjustment block 144 is in close contact between the flat plate-shaped block 142 and the rear surface 124c of the second intermediate die block 124, thereby eliminating the separation risk while in use.

The detailed description of the step adjustment block 144 is the same as the description made with reference to FIGS. 5 and 6.

Meanwhile, the multi-slot die coater may further include a flat plate-shaped fixing portion 140' fastened to the rear surface 130c of the upper die block 130 and the rear surface 124c of the second intermediate die block 124 using the bolt 141 and a flat plate-shaped fixing portion 140" fastened to the rear surface 122c of the first intermediate die block 122 and the rear surface 110c of the lower die block 110 using the bolts 141a, 141b. A plurality of fixing blocks 140 may be provided along the widthwise direction of the multi-slot die coater 100' as shown in FIG. 20. The bolts 141a, 141b are fastened to the fixing block 140, and through this, the lower die A and the intermediate die B are assembled. The flat plate-shaped fixing portion 140' may be provided between the two fixing blocks 140. The bolt 141 is fastened to the flat plate-shaped fixing portion 140', and through this, the upper die block 130 and the second intermediate die block 124 are assembled. In another example, the fixing block 140 may be provided between two flat plate-shaped fixing portions 140'. The bolt 141 is fastened to the flat plate-shaped fixing portion 140", and through this, the first intermediate die block 122 and the lower die block 110 are assembled. In still another example, the fixing block 140 may be provided between two flat plate-shaped fixing portions 140". The fixing block 140 can reliably achieve uniform widthwise gap control through the large surface contact of the means such as the block.

Figure 21:
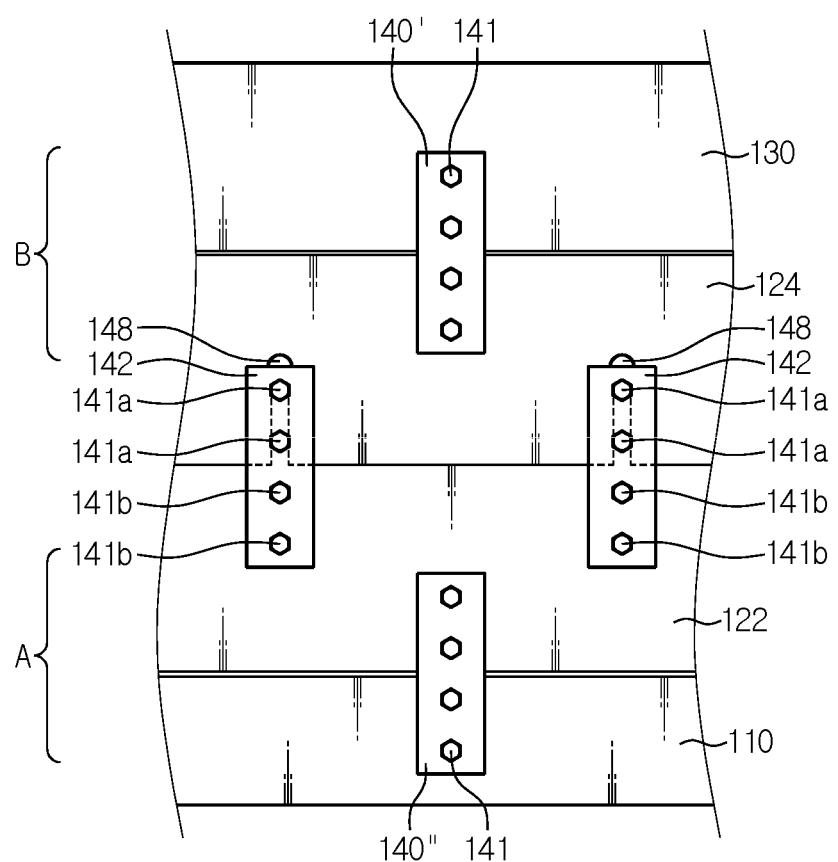
FIG. 21 is a variation of FIG. 20.

FIG. 21 is a variation of FIG. 20. Referring to FIG. 21, two bolts are fastened to each one die block perpendicular to the coupling surface of the second intermediate die block 124 and the first intermediate die block 122, and thus two bolts 141a are fastened to the second intermediate die block 124 and two bolts 141b are fastened to the first intermediate die block 122. In this instance, the depth of the groove 146 of the step adjustment block (see 144 of FIG. 6) is long enough to fit over the two bolts 141a.

The upper die block 130 and the second intermediate die block 124 are fixed and coupled to each other by the construction of the flat plate-shaped fixing portion 140', and the first intermediate die block 122 and the lower die block 110 are fixed and coupled to each other by the construction of the flat plate-shaped fixing portion 140". Accordingly, the upper die block 130 and the second intermediate die block 124 may move together, and the first intermediate die block 122 and the lower die block 110 may move together. That is, a first flat surface (in this embodiment, the first surface 122a of the first intermediate die block 122) formed on the lower die A and a second flat surface (in this embodiment, the second surface 124b of the second intermediate die block 124) formed below the upper die B contact each other to form a sliding surface, and the upper die B and the lower die A are installed such that any one die slides along the sliding surface to make relative movement in the horizontal direction.

When it is necessary to change the relative position between the lower exit port 101a and the upper exit port 102a, the multi-slot die coater 100' according to an embodiment of the present disclosure can simply adjust by the sliding movement of the lower die A and/or the upper die B, and does not need to disassemble and re-assemble each die block 110, 120, 130, thereby significantly improving workability. The relative position of the upper exit port 102a and the lower exit port 101a is adjusted, and as the fixing block 140 is coupled between the lower die A and the upper die B, the coating gap is determined accordingly. Additionally, when it is necessary to adjust the step, mounting/demounting of the step adjustment block 144 may be used. Accordingly, it is possible to greatly reduce the inconvenience of dissembling the die blocks 130, 122, 124, 110 and adjusting the position to adjust the coating gap each time.

This embodiment shows that the length of the upper die B (for example, the horizontal distance from the rear surface 130c of the upper die block 130 to the upper die lip 131) is shorter than the length of the lower die A (for example, the horizontal distance from the rear surface 110c of the lower die block 110 to the lower die lip 111) by way of illustration. In this state, when the step is formed in the rear surface of the upper die B relative to the rear surface of the lower die A as shown in FIG. 18, the lower die lip 111, the first and second intermediate die lips 121a, 121b and the upper die lip 131 may be disposed on the same straight line. In this case, various film coating may be performed by moving back and forth the entire multi-slot die coater 100' with respect to the substrate 300.

According to this embodiment described above, the step is formed between the rear surfaces of the upper die B and the lower die A through the fixing block 140 including the step adjustment block 144. That is, the die blocks are coupled using the bolts 141a, 141b fastened to the flat plate-shaped block 142, and when it is necessary to adjust the step between the die blocks, the step adjustment block 144 of the suitable thickness h to make the corresponding step may be additionally mounted between the flat plate-shaped block 142 and the die block to form the step. In this embodiment, the step adjustment block 144 is mounted between the second intermediate die block 124 and the flat plate-shaped block 142 and the first intermediate die block 122 is coupled to the flat plate-shaped block 142, and thus the step corresponding to the thickness h of the step adjustment block 144 may be naturally formed between the rear surfaces 124c, 123c of the die blocks 124, 122 by the coupling. Thus, it is possible to always maintain the distance between the first and second intermediate die lips 121a, 121b at the front end of the die blocks 124, 122 and the substrate 300, i.e., the coating gap at a desired level, and since the fixing block 140 is fixed between the die blocks 124, 122, thus once it is set, the coating gap does not change and is maintained during the process.

Subsequently, other embodiments of the present disclosure will be described with reference to FIGS. 22 to 27. The same reference numerals as the previous embodiment denote the same elements, overlapping descriptions of the same elements are omitted, and difference(s) from the previous embodiments is mainly described.

Figure 22:
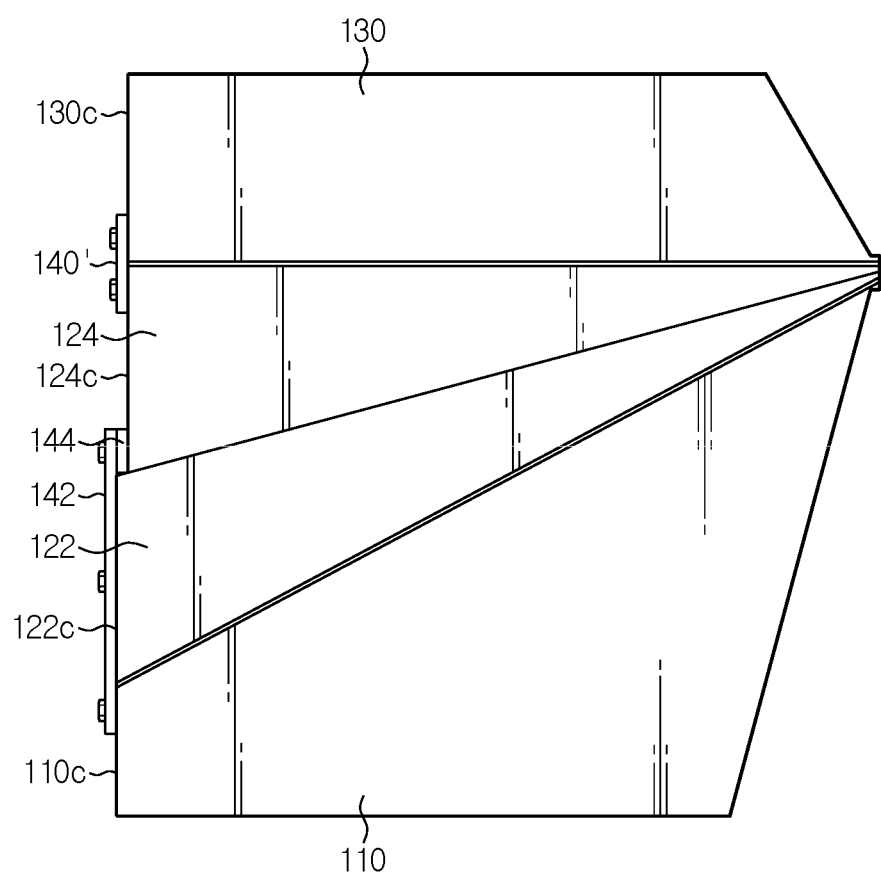
FIGS. 22 to 27 are schematic cross-sectional views of multi-slot die coaters according to other embodiments of the present disclosure.

The multi-slot die coater shown in FIG. 22 shows that the flat plate-shaped block 142 of the fixing block 140 shown and described in FIG. 18 is extended to the rear surface 110c of the lower die block 110 and thus the flat plate-shaped block 142 is also coupled to the rear surface 110c of the lower die block 110. In this case, when the second intermediate die block 124 and the first intermediate die block 122 are coupled through the flat plate-shaped block 142, the step may be formed between the rear surfaces 124c, 122c by the step adjustment block 144, and the lower die block 110 may be also coupled to the flat plate-shaped block 142, and thus the multi-slot die coater may not include the flat plate-shaped fixing portion (see 140" of FIG. 20) fastened to the rear surface 122c of the first intermediate die block 122 and the rear surface 110c of the lower die block 110 using the bolt 141, and may further include the flat plate-shaped fixing portion in the fixing block 140, if necessary.

Figure 23:
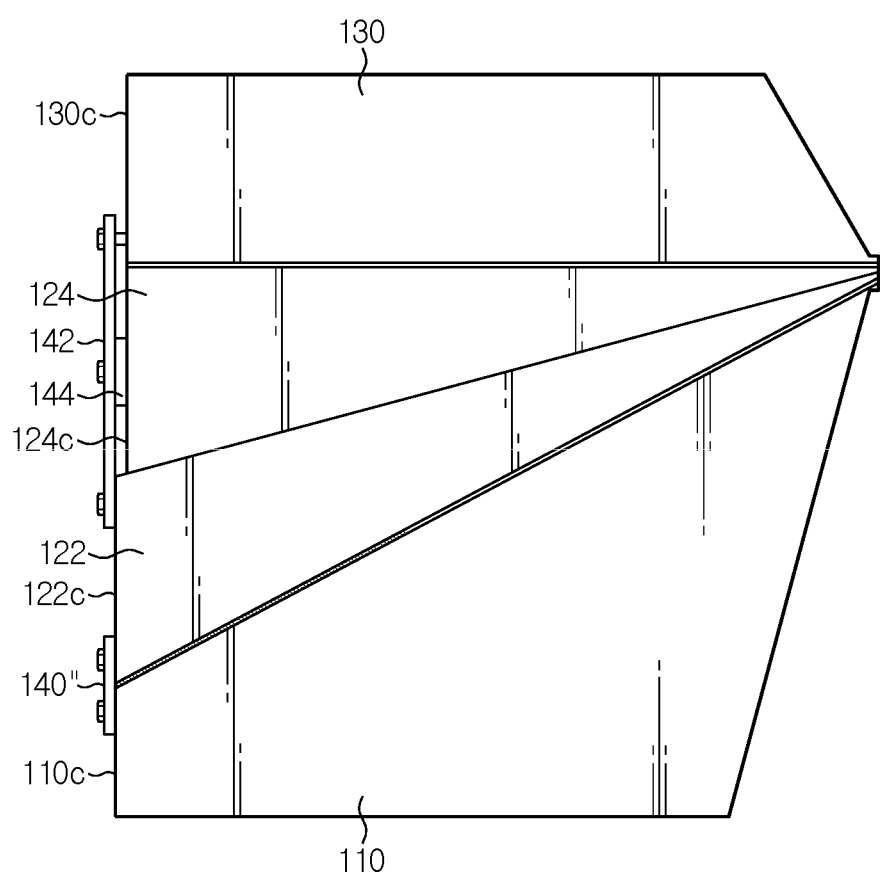

The multi-slot die coater shown in FIG. 23 shows that the flat plate-shaped block 142 of the fixing block 140 shown and described in FIG. 18 is extended to the rear surface 130c of the upper die block 130 and thus the flat plate-shaped block 142 is also coupled to the rear surface 130c of the upper die block 130. In this case, when the second intermediate die block 124 and the first intermediate die block 122 are coupled through the flat plate-shaped block 142, the step is formed between the rear surfaces 124c, 122c by the step adjustment block 144, and the upper die block 130 is also coupled to the step adjustment block 144, and thus the multi-slot die coater may not include the flat plate-shaped fixing portion (see 140' of FIG. 20) fastened to the rear surface 130c of the upper die block 130 and the rear surface 124c of the second intermediate die block 124 using the bolt 141, and may further include the flat plate-shaped fixing portion in the fixing block 140, if necessary.

Figure 24:
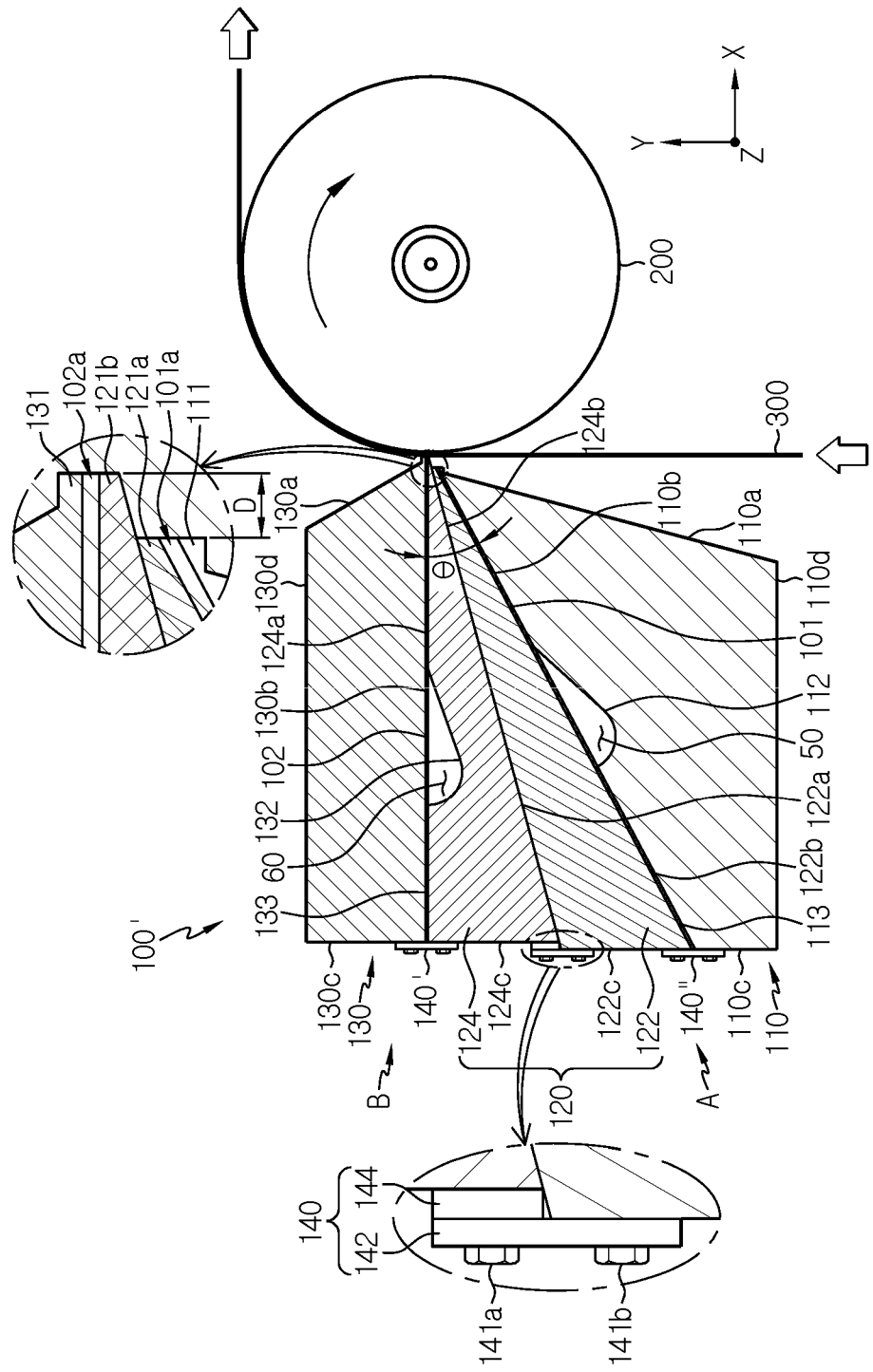

As opposed to the multi-slot die coater 100' of FIG. 18, the multi-slot die coater shown in FIG. 24 has the step D between the lower exit port 101a and the upper exit port 102a. When the length of the upper die B is equal to the length of the lower die A, the upper die lip 131 and the second intermediate die lip 121b may move further forward to the substrate 300 than the first intermediate die lip 121a and the lower die lip 111 by the thickness h of the step adjustment block 144 of the fixing block 140. Thus, the step D between the lower exit port 101a and the upper exit port 102a may be equal to the thickness h of the step adjustment block 144 of the fixing block 140. When the step D is formed between the lower exit port 101a and the upper exit port 102a, the lower exit port 101a and the upper exit port 102a are spaced apart from each other along the horizontal direction, and thus there is no risk that the second coating solution 60 issuing from the upper exit port 102a may enter the lower exit port 101a, or the first coating solution 50 issuing from the lower exit port 101a may enter the upper exit port 102a.

That is, there is no risk that the coating solution issuing through the lower exit port 101a or the upper exit port 102a may be blocked by the surface that forms the step between the lower exit port 101a and the upper exit port 102a and enter the other exit port, thereby performing a more smooth multi-layer active material coating process.

As described above, the multi-slot die coater 100' has the two exit ports 101a, 102a and may be used to form two active material layers on the current collector, and for smooth coating of the active material slurry, the two exit ports 101a, 102a may be disposed at the front and rear positions, spaced apart from each other along the horizontal direction. The relative movement of the lower die A and the upper die B may be made using a separate device for adjusting the shape of the multi-slot die coater 100' or through an operator's manual task.

For example, the step may be formed between the lower exit port 101a and the upper exit port 102a by moving the upper die B to the predetermined distance D in the forward direction that is the same as the direction in which the active material slurry emerges along the sliding surface while not moving the lower die A. Additionally, the step is maintained by fastening the fixing block 140. The width D of the step may be determined in the range of approximately a few micrometers to a few millimeters, and may be determined based on the thickness of the active material layer formed on the current collector. For example, as the thickness of the active material layer that will be formed on the current collector increases, the width D of the step may increase.

Figure 25:
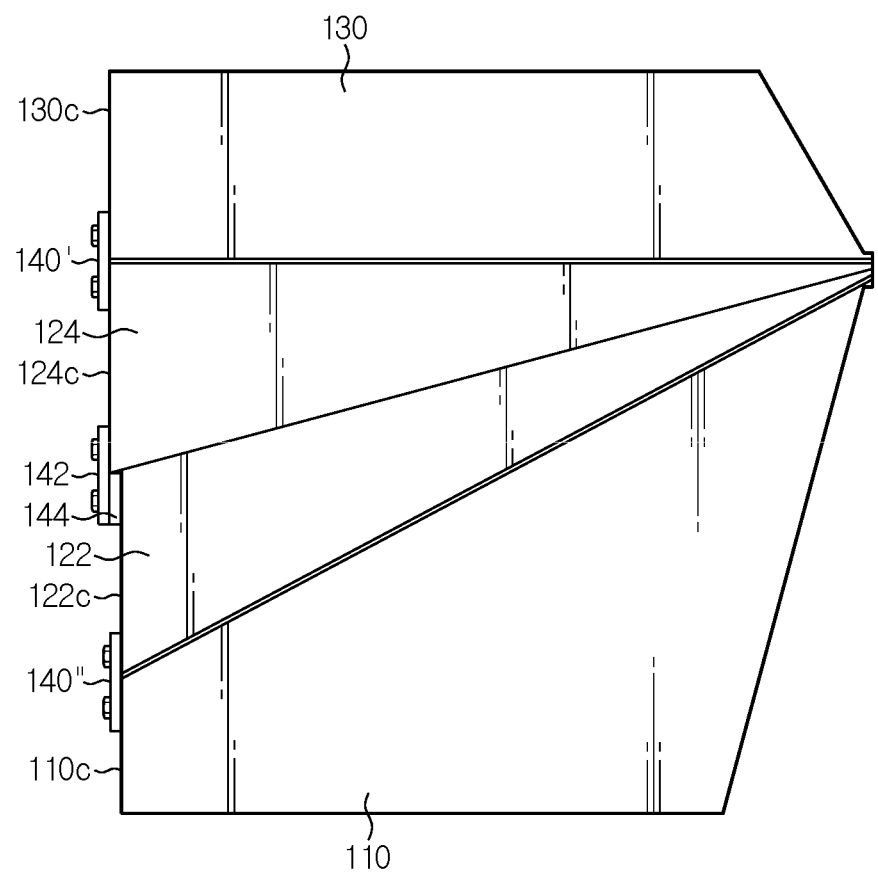

In FIG. 25, the location at which the step is formed between the rear surface of the upper die B and the rear surface of the lower die A is the same as that of the multi-slot die coater 100' of FIG. 18, but the step adjustment block 144 of the fixing block 140 is in close contact with the rear surface 120c of the first intermediate die block 122, not the rear surface 124c of the second intermediate die block 124.

When the step is formed between the rear surfaces 124c, 122c of the two die blocks 124, 122, the step adjustment block 144 of the fixing block 140 may come into close contact with the rear surface of any one of the two die blocks 124, 122. The die block having the rear surface in close contact with the step adjustment block 144 moves forward to the substrate (see 300 of FIG. 18).

In this example, when the length of the upper die B is equal to the length of the lower die A, as opposed to FIG. 23, the lower exit port 101a moves further forward to the substrate 300 than the upper exit port 102a to form the step between the lower exit port 101a and the upper exit port 102a. In this instance, the lower die lip 111 on the downstream side in the movement direction of the substrate 300 is closer to the substrate 300 than the upper die lip 131 on the upstream side. Due to this feature, it is possible to uniformly adjust the thickness by applying pressure to the first coating solution 50 issuing from the lower exit port 101a by the lower die lip 111 and expanding the first coating solution 50 in the widthwise direction.

Figure 26:
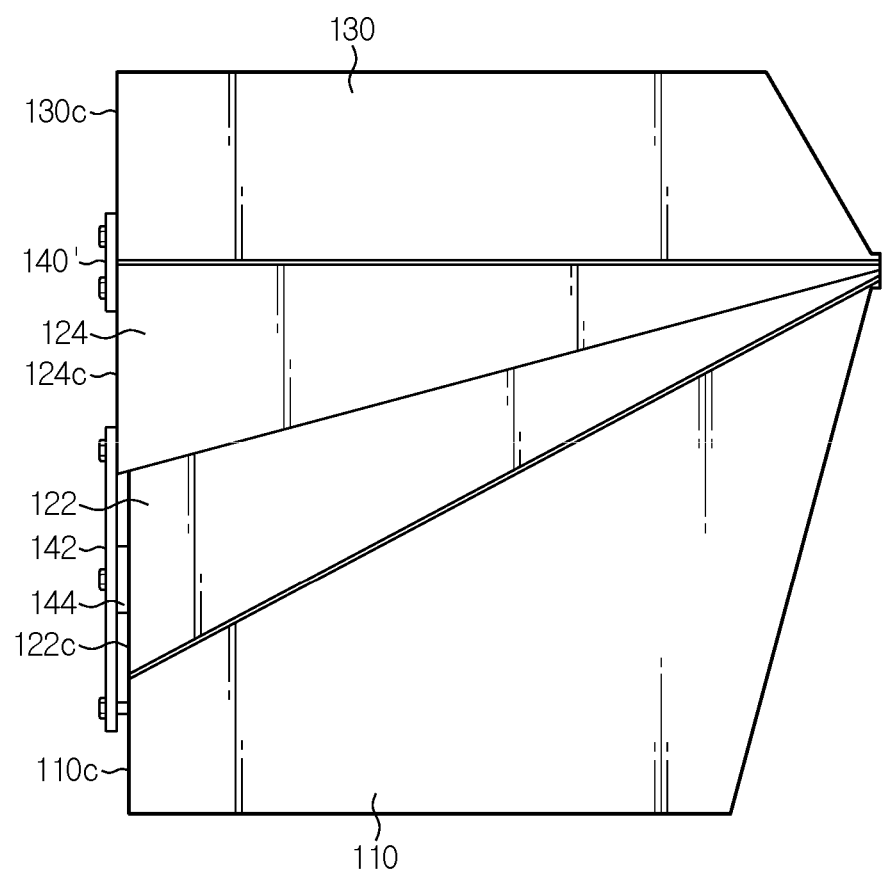

FIG. 26 is similar to FIG. 25, and is an embodiment showing that the flat plate-shaped block 142 of the fixing block 140 is simply extended to the rear surface 110c of the lower die block 110, and thus may be also coupled to the rear surface 110c of the lower die block 110.

Figure 27:
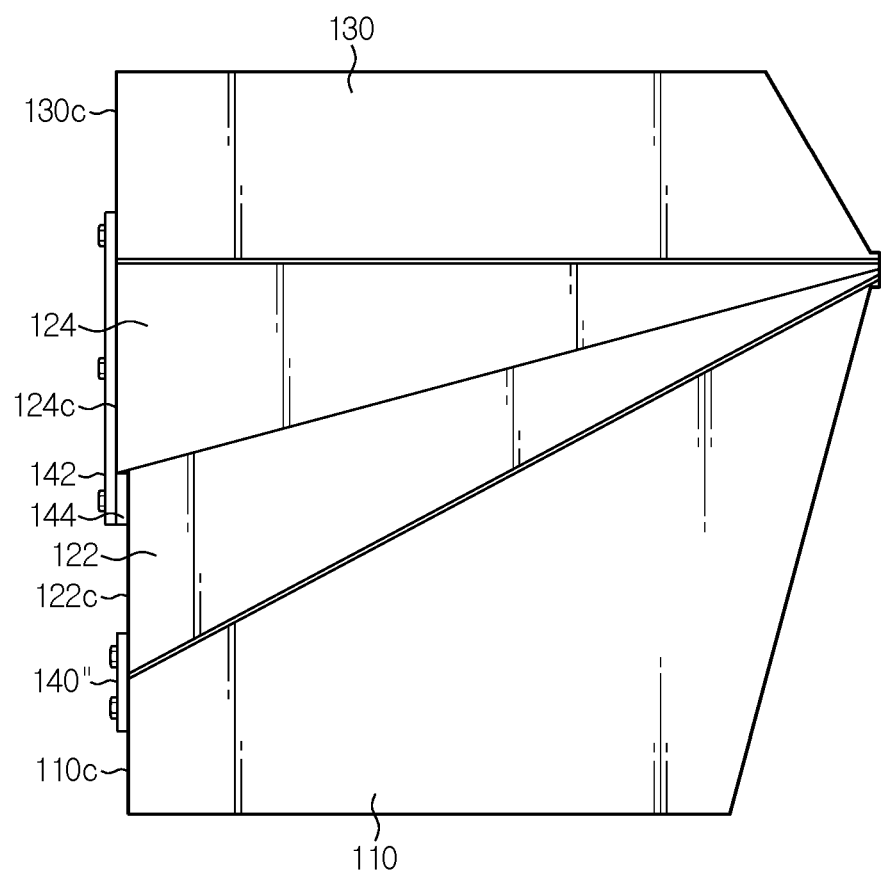

Additionally, FIG. 27 is similar to FIG. 25, and is an embodiment showing that the flat plate-shaped block 142 of the fixing block 140 is simply extended to the rear surface 130c of the upper die block 130, and thus may be also coupled to the rear surface 130c of the upper die block 130.

Accordingly, when it is necessary to change the relative position between the lower exit port and the upper exit portion depending on the thickness of the active material layer coated on the current collector, the slot die coater 100' according to the present disclosure may simply adjust by the sliding movement of the lower die and/or the upper die, and as opposed to the conventional slot die coater, does not need to disassemble and re-assemble each die block, thereby significantly improving workability, and in particular, it is possible to set and maintain the step to have a desired coating gap through simple manipulation of fastening the fixing block 140.

While the present disclosure has been described with respect to a limited number of embodiments and drawings, the present disclosure is not limited thereto, and it will be apparent to those skilled in the art that a variety of changes and modifications may be made thereto within the technical aspects of the present disclosure and the appended claims and their equivalent scope.

Meanwhile, although terms indicating directions such as up, down, left, and right are used in the present specification, these terms are only for convenience of description, and it is apparent to those skilled in the art that these terms may be changed depending on a position of a target object or a position of an observer.

What is claimed is:

1. A multi-slot die coater comprising:
a first outer die block;
an intermediate die block positioned adjacent to the first outer die block forming a first slot in between the intermediate die block and the first outer die block; and
a second outer die block positioned adjacent to the intermediate die block such that a second slot is formed between the second outer die block and the intermediate die block,
wherein the first outer die block, the intermediate die block and the second outer die block include a first outer die lip, an intermediate die lip and a second outer die lip that form front ends thereof, respectively, wherein a fixing block is included on rear surfaces of the first outer, intermediate and second outer die blocks at a side opposite the front end, the fixing block fastened to the rear surfaces of at least a set of two die blocks among the first outer, intermediate and second outer die blocks to couple the set of two die blocks, and wherein the fixing block includes a planar plate-shaped block having a reference plane in contact with the rear surface of any one die block of the set of two die blocks, and a step adjustment block which is configured to be mounted and dismounted between the rear surface of an alternative die block from the set of two die blocks and the planar plate-shaped block, the step adjustment block having a sufficient thickness to form a step between the rear surfaces of the die blocks coupled to the fixing block when mounted, wherein the step adjustment block is configured to be mounted without removing a fastener fastening the planar plate-shaped block to the rear surfaces of the set of two die blocks.

2. The multi-slot die coater according to claim 1, wherein the planar plate-shaped block couples the second outer die block and the intermediate die block, and the step adjustment block contacts the rear surface of the second outer die block or the rear surface of the intermediate die block.

3. The multi-slot die coater according to claim 2, wherein the planar plate-shaped block extends to the rear surface of the first outer die block and is coupled to the rear surface of the first outer die block.

4. The multi-slot die coater according to claim 2, further wherein:
the planar plate-shaped block is fastened to the rear surface of the intermediate die block and the rear surface of the first outer die block with the fastener.

5. The multi-slot die coater according to claim 1, wherein the planar plate-shaped block couples the intermediate die block and the first outer die block, and the step adjustment block contacts the rear surface of the intermediate die block or the rear surface of the first outer die block.

6. The multi-slot die coater according to claim 1, wherein a plurality of fixing blocks is provided in a widthwise direction of the multi-slot die coater.

7. The multi-slot die coater according to claim 1, wherein a cross section extending across the step adjustment block and the reference plane in the fixing block includes a first cross section portion and a second cross section portion extending perpendicular to the first cross section portion.

8. The multi-slot die coater according to claim 1, wherein the step adjustment block is a plate-shaped member having a groove recessed from a surface in a direction perpendicular to a thickness direction to fit over the fastener fastened to the planar plate-shaped block.

9. The multi-slot die coater according to claim 8, wherein a handle used when mounting or dismounting is provided on a surface of the plate-shaped member.

10. The multi-slot die coater according to claim 8, wherein the fastener includes a plurality of bolts fastened to the planar plate-shaped block is provided along a horizontal or vertical direction of the planar plate-shaped block, and the step adjustment block is fit over at least one of the plurality of bolts.

11. The multi-slot die coater according to claim 10, wherein the step adjustment block has a size corresponding to each bolt.

12. A multi-slot die coater, comprising:
a first outer die including a first slot, and a second outer die positioned adjacent to the first outer die, the second outer die including a second slot, wherein a first planar surface formed on the first outer die and a second planar surface formed on the second outer die contact each other to form a sliding surface, and the first outer die and the second outer die are installed such that any one of the first outer die and the second outer die slides along the sliding surface to move relative to each other, wherein a fixing block is included on rear surfaces on a side opposite a front end of the first outer die and the second outer die, the fixing block fastened to the rear surfaces of the first outer die and the second outer die to couple the first outer die and the second outer die, and the fixing block includes a planar plate-shaped block having a reference plane that contacts the rear surface of any one of the first and second outer dies, and a step adjustment block which is configured to be mounted and dismounted between the rear surface of an alternative die among the first and second outer dies and the planar plate-shaped block, the step adjustment block having a sufficient thickness to form a step between the rear surfaces of the first and second outer dies coupled to the fixing block when mounted, wherein the step adjustment block is configured to be mounted without removing a fastener fastening the planar plate-shaped block to the rear surfaces of the first outer die and the second outer die.

13. The multi-slot die coater according to claim 12, wherein the first outer die includes a first outer die block, and a first intermediate die block positioned adjacent to the first outer die block such that the first slot is formed between the first intermediate die block and the first outer die block, and
the second outer die includes a second intermediate die block adjacent to the first intermediate die block, and a second outer die block positioned adjacent to the second intermediate die block such that the second slot is formed between the second outer die block and the second intermediate die block.

14. The multi-slot die coater according to claim 13, wherein the planar plate-shaped block couples the first intermediate die block and the second intermediate die block, and the step adjustment block contacts the rear surface of the second intermediate die block or the rear surface of the first intermediate die block.

15. The multi-slot die coater according to claim 14, wherein:
the planar plate-shaped block is fastened to the rear surface of the second outer die block and the rear surface of the second intermediate die block using the fastener, or the planar plate-shaped block is fastened to the rear surface of the first intermediate die block and the rear surface of the first outer die block using the fastener.

16. The multi-slot die coater according to claim 14, wherein the planar plate-shaped block extends to the rear surface of the second outer die block, and is coupled to the rear surface of the second outer die block.

17. The multi-slot die coater according to claim 14, wherein:
the planar plate-shaped block is fastened to the rear surface of the second outer die block and the rear surface of the intermediate die block with the fastener.

18. The multi-slot die coater according to claim 12, wherein the step adjustment block is a plate-shaped member having a groove recessed from a surface in a direction perpendicular to a thickness direction to fit over the fastener fastened to the planar plate-shaped block.

19. The multi-slot die coater according to claim 18, wherein a handle used when mounting or dismounting is provided on a surface of the plate-shaped member.

20. The multi-slot die coater according to claim 18, wherein the fastener includes a plurality of bolts fastened to the planar plate-shaped block provided along a horizontal or vertical direction of the planar plate-shaped block, and the step adjustment block is fit over at least one of the plurality of bolts.

* * * * *